US012511834B2

(12) United States Patent
Mohamed et al.

(10) Patent No.: US 12,511,834 B2
(45) Date of Patent: Dec. 30, 2025

(54) VISUALIZATION OF AI-GENERATED PREDICTIONS FROM 3D DATA

(71) Applicant: SONY GROUP CORPORATION, Tokyo (JP)

(72) Inventors: Shehnaz Mohamed, Bengaluru (IN); Abhishake Jha, Bengaluru (IN)

(73) Assignee: SONY GROUP CORPORATION, Tokyo (JP)

( * ) Notice: Subject to any disclaimer, the term of this patent is extended or adjusted under 35 U.S.C. 154(b) by 231 days.

(21) Appl. No.: 18/326,785

(22) Filed: May 31, 2023

(65) Prior Publication Data
US 2024/0404199 A1 Dec. 5, 2024

(51) Int. Cl.
*G06V 10/00* (2022.01)
*G06T 7/11* (2017.01)
*G06T 7/70* (2017.01)
*G06T 17/20* (2006.01)
*G06V 10/25* (2022.01)
*G06V 10/44* (2022.01)
*H04N 13/275* (2018.01)

(52) U.S. Cl.
CPC ............... *G06T 17/20* (2013.01); *G06T 7/11* (2017.01); *G06T 7/70* (2017.01); *G06V 10/25* (2022.01); *G06V 10/44* (2022.01); *H04N 13/275* (2018.05); *G06T 2207/20084* (2013.01); *G06V 2201/07* (2022.01)

(58) Field of Classification Search
CPC ...... G06T 2207/20084; G06V 2201/07; G06V 10/766
USPC ........................................................ 345/420
See application file for complete search history.

(56) References Cited

U.S. PATENT DOCUMENTS 11,443,555 B2 9/2022 Sriram et al.
12,248,299 B2 * 3/2025 May ................... G05B 19/4099
(Continued)

FOREIGN PATENT DOCUMENTS

WO 2019/221767 A1 11/2019

OTHER PUBLICATIONS

Charles R. Qi et al: "PointNet: Deep Learning on Point Sets for 3D Classification and Segmentation", arxiv, Apr. 10, 2017 (Apr. 10, 2017), pp. 1-19, XP055874762, Retrieved from the Internet [retrieved on Dec. 20, 2021].
(Continued)

*Primary Examiner* — Samantha (Yuehan) Wang
(74) *Attorney, Agent, or Firm* — CHIP LAW GROUP

(57) ABSTRACT

An electronic apparatus and method for visualization of AI-generated predictions from 3D data is provided. The electronic apparatus acquires 3D data associated with a 3D environment that includes a 3D object and partitions the 3D data into data blocks. The electronic apparatus generates variations of the 3D data based on a modification of the data blocks and further generates 3D object detection results corresponding to the variations based on an application of a 3D object detection model on the variations. The electronic apparatus trains a regression model based on the 3D object detection results and determines a weight value, based on the trained regression model, that indicates a likelihood that a data block of the data blocks belongs to the 3D object. The electronic apparatus generates a first 3D heatmap visualization of the 3D object based on the weight value for each data block of the data blocks.

18 Claims, 8 Drawing Sheets

(56) References Cited

U.S. PATENT DOCUMENTS

| | | |
|---|---|---|
| 2017/0104927 A1 | 4/2017 | Mugavero et al. |
| 2022/0051020 A1* | 2/2022 | Jha .......................... G06T 11/20 |
| 2022/0156577 A1* | 5/2022 | Jha .......................... G06N 3/08 |
| 2023/0281961 A1* | 9/2023 | Fazlali .................. G06V 10/82 |
| | | 382/103 |

OTHER PUBLICATIONS

Tan Hanxiao et al: "Surrogate Model-Based Explainability Methods for Point Cloud NNs", 2022 IEEE/CVF Winter Conference on Applications of Computer Vision (WACV), IEEE, Jan. 3, 2022 (Jan. 3, 2022), pp. 2927-2936, XP034086075, DOI: 10.1109/WACV51458. 2022.00298 [retrieved on Feb. 7, 2022].

* cited by examiner

VISUALIZATION OF AI-GENERATED PREDICTIONS FROM 3D DATA

CROSS-REFERENCE TO RELATED APPLICATIONS/INCORPORATION BY REFERENCE

None.

FIELD

Various embodiments of the disclosure relate to object detection and generation of explanations of object detection results. More specifically, various embodiments of the disclosure relate to visualization of AI-generated predictions from 3-Dimensional data.

BACKGROUND

Advancements in the field of 3D object detection have allowed for the detection and classification of objects in 3D data. However, explainability of these models remains a significant challenge. Most 3D object detection models currently in use are based on deep learning techniques, which are known to be accurate but frequently lack transparency and interpretability. As a result, it may be difficult to understand how the models make predictions and why they may be incorrect. Users may struggle to understand why a specific object was detected or why a false positive or false negative occurred due to the lack of transparency in the decision-making process of 3D object detection models. This is especially important in real-world applications such as autonomous driving, where incorrect detections may have serious consequences. Understanding the reasoning behind a model's predictions may be critical in these scenarios for ensuring the system's safety and reliability.

Current methods for explaining the predictions of 3D object detection models frequently rely on visualizing the model's feature maps, which may be difficult to interpret for non-experts. Furthermore, these methods do not provide a complete understanding of the decision-making process, giving users only a limited understanding of the model's behavior. As a result, there is a need for a method for explaining 3D object detection model predictions that is both understandable to non-experts and provides a comprehensive understanding of the model's behavior.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic apparatus and method for visualization of artificial intelligence (AI)-generated predictions from 3-Dimensional (3D) data, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
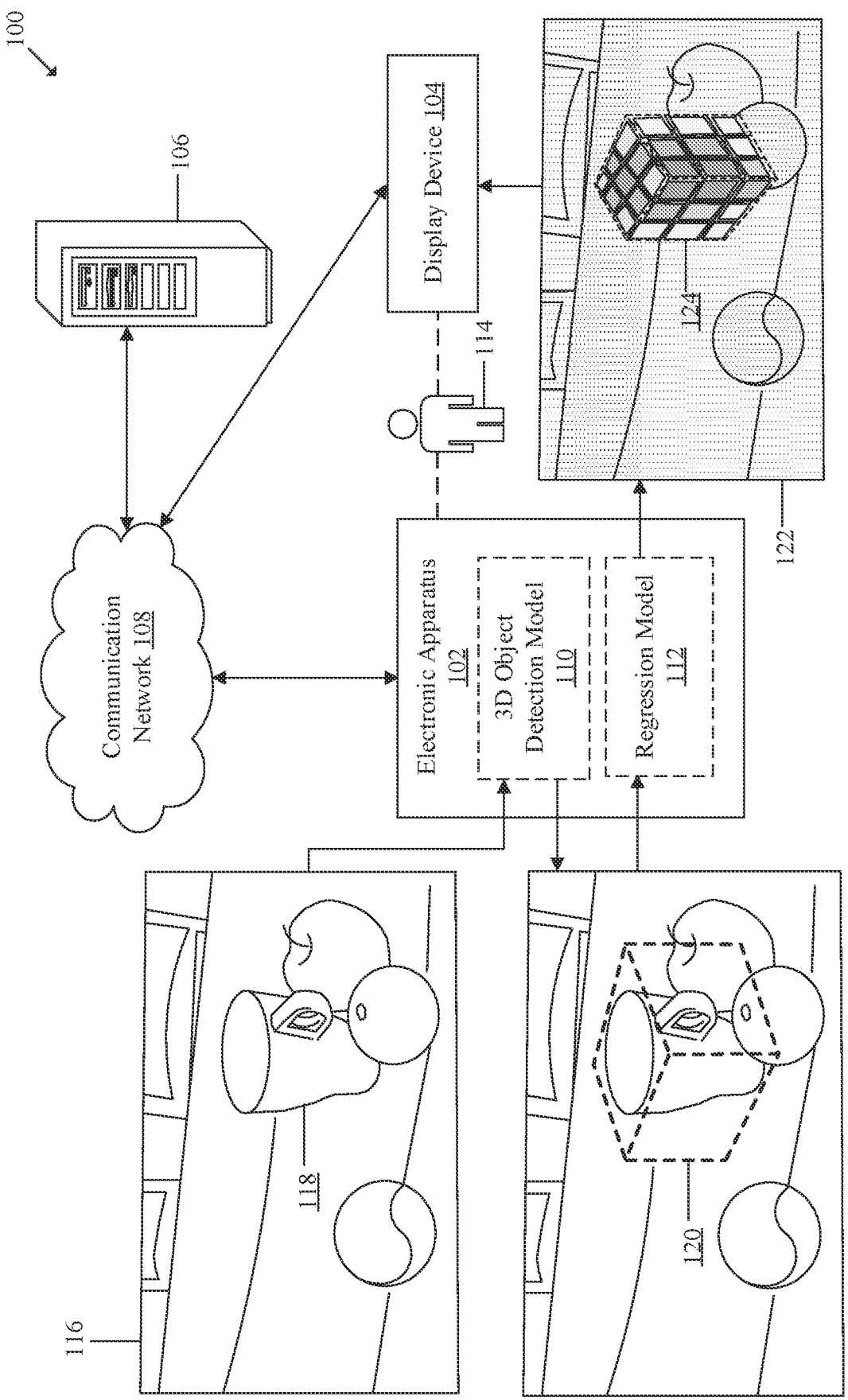
FIG. 1 is a diagram that illustrates an exemplary network environment for visualization of artificial intelligence (AI)-generated predictions from 3-Dimensional (3D) data, in accordance with an embodiment of the disclosure.

The following described implementations may be found in a disclosed electronic apparatus and method for visualization of artificial intelligence (AI)-generated predictions from three-dimensional (3D) data. Exemplary aspects of the disclosure provide an electronic apparatus (for example, a computing device, a server, a gaming console, or a smart wearable device) that may include a 3D object detection model for detection of 3D objects from the 3D data and may generate a 3D visualization (for example, a 3D heatmap) of the detected 3D objects. The electronic apparatus may further include a memory that may be configured to store the 3D object detection model. The electronic apparatus may acquire 3D data (for example, a point cloud frame, a mesh frame, or a 3D video frame) associated with a 3D environment that may include a 3D object of interest. After the acquisition, the electronic apparatus may partition the 3D data into a set of data blocks and may generate variations of the 3D data based on a modification (such as removal of a subset of data blocks) of the set of data blocks. The electronic apparatus may generate a 3D object detection result (such as a 3D bounding box for the 3D object) corresponding to each of the generated variations of the 3D data based on a sequential application of the 3D object detection model on the generated variations of the 3D data. The electronic apparatus may further train a regression model based on the 3D object detection results and may determine a weight value that indicates a likelihood that a data block of the set of data blocks belongs to the 3D object. The regression model may be a decision tree regressor, a linear regressor, a non-linear regressor, or an ensemble model such as an ensemble of regression models that uses one of bagging, boosting, or stacking. For example, the regression model may be a random forest model, that is, an ensemble of decision tree models. The weight value may be determined based on the trained regression model. The electronic apparatus may further generate a 3D heatmap visualization of the 3D object included in the 3D data based on the determined weight value for each data block of the set of data blocks.

Typically, neural network models (such as deep learning models) are trained to detect objects in 2D or 3D data and assign a class label to the detected objects. The deep learning models may operate as a black-box and a reliability of the detections may be unknown to users. To aid in the understanding of detections (i.e., predictions generated at the output layers of the deep learning models) in the 2D data (such as images or videos), existing systems may render 2D visualizations to localize the detected object(s) of interest in an image or a video. However, accurate rendering of the object detections based on such visualizations may be challenging. The challenges involved in rendering of 3D object detections using 3D visualizations, which may accurately indicate regions of 3D data (such as a point cloud or a mesh) may be even greater compared to that for the 2D detections.

To address the abovementioned issues, the proposed electronic apparatus may be configured to generate a 3D visualization frame that is inclusive of a 3D visualization for a 3D object detection in a 3D data frame. In some scenarios, a set of 3D visualizations frames corresponding to a set of 3D data frames may be generated sequentially. Each 3D visualization frame may enable rendering of one or more 3D visualizations for one or more 3D object detections. The one or more 3D visualizations may be static or dynamic across the set of 3D data frames. A 3D visualization for a 3D object detection in a 3D data frame may be generated based on a trained regression model (which may be included in the electronic apparatus). The regression model may be trained based on variations of the 3D data frame that may be obtained based on variations of the 3D data frame. The training of the regression model may be further based on outcomes of 3D object detections that may be obtained based on application of a 3D object detection model (also included in the electronic apparatus) on the variations of the 3D data frame.

Once the regression model is trained, a set of weight values that correspond to a set of data blocks of the 3D data frame may be determined. Each weight value of the set of weight values may signify a weightage of a corresponding data block of the set of data blocks in the outcomes of the 3D object detections. The 3D visualization for the 3D object detection in the 3D data frame may be generated based on the set of weight values. The 3D visualization may indicate a region (such as cuboid that may constitute a subset of data blocks of the set of data blocks) of the 3D data frame that may belong to a 3D object of interest. Further, the 3D visualization may serve as an explanation that allows a user to develop an efficient understanding of the outcomes of the 3D object detections in the variations of the 3D data frame and, accordingly, improve a performance of the 3D object detection model if necessary. An accuracy of the 3D visualization may be evaluated based on one or more visualization metrics that may be determined based on the set of weight values.

FIG. 1 is a diagram that illustrates an exemplary network environment for visualization of artificial intelligence (AI)-generated predictions from three-Dimensional (3D) data, in accordance with an embodiment of the disclosure. With reference to FIG. 1, there is shown a network environment 100. The network environment 100 may include an electronic apparatus 102, a display device 104, and a server 106. The electronic apparatus 102 may communicate with the display device 104 and the server 106, through one or more networks (such as a communication network 108). The electronic apparatus 102 may include a 3D object detection model 110, and a regression model 112. The 3D object detection model 110 may be a neural network model (for example, a Deep Neural Network (DNN) model). There is further shown a user 114 who may be associated with the electronic apparatus 102 or the display device 104.

The electronic apparatus 102 may include suitable logic, circuitry, interfaces, and/or code that may be configured to generate a 3D visualization frame that may include a 3D heatmap visualization of the 3D object(s) that may be present in 3D data (such as point cloud data or voxel data). Examples of the electronic apparatus 102 may include, but are not limited to, a computing device, a tablet, a smartphone, a smart wearable device, a gaming console, a virtual reality (VR) device, an augmented reality (AR) device, a mixed reality (MR) device, a mainframe machine, a computer workstation, an internet of things (IoT) device, and/or any consumer electronic (CE) device.

The display device 104 may include suitable logic, circuitry, interfaces, and/or code that may be configured to receive control instructions from the electronic apparatus 102. Based on the control instructions, the display device 104 may render 3D data (i.e., an input 3D data frame or a 3D video), 3D object detection results, and the 3D visualization frame that includes the 3D heatmap visualization(s). In FIG. 1, the electronic apparatus 102 and the display device 104 are shown as two separate devices merely as an example. In some embodiments, the entire functionality of the display device 104 may be incorporated in the electronic apparatus 102, without a deviation from the scope of the disclosure.

In accordance with an embodiment, the display device 104 may include a touch screen to receive a user input from the user 114. The display device 104 may be realized through several known technologies such as, but not limited to, a Liquid Crystal Display (LCD) display, a Light Emitting Diode (LED) display, a plasma display, and/or an Organic LED (OLED) display technology, and/or other display technologies. In accordance with an embodiment, the display device 104 may refer to a display screen of a head mounted device (HMD), a smart-glass device, a see-through display, a projection-based display, an electro-chromic display, or a transparent display.

The server 106 may include suitable logic, circuitry, interfaces, and/or code that may be configured to store neural network models (such as the 3D object detection model 110) and the regression model 112. The server 106 may be configured to receive a request from the electronic apparatus 102 to import the 3D object detection model 110 and/or the regression model 112. The server 106 may transmit the 3D object detection model 110 and/or the regression model 112 to the electronic apparatus 102 based the received request. In some embodiments, the server 106 may receive, from the electronic apparatus 102, an input 3D data frame (i.e., the 3D data) and a request for generation of a 3D heatmap visualization of a certain 3D object of interest that may be included in the input 3D data frame. The server 106 may use the 3D object detection model 110 to detect the 3D object of interest in the received input 3D data frame and use the regression model 112 to determine data blocks of the input 3D data frame that contribute to 3D object detection results obtained using the 3D object detection model 110. Thereafter, the server 106 generate a 3D heatmap visualization that indicates the determined data blocks and transmit the generated 3D heatmap visualization to the electronic apparatus 102.

The server 106 may execute operations through web applications, cloud applications, HTTP requests, repository operations, file transfer, and the like. Example implementations of the server 106 may include, but are not limited to, a database server, a file server, a web server, an application server, a mainframe server, a cloud computing server, or a combination thereof. In at least one embodiment, the server 106 may be implemented as a plurality of distributed cloud-based resources by use of several technologies that are well known to those ordinarily skilled in the art. A person with ordinary skill in the art will understand that the scope of the disclosure may not be limited to the implementation of the server 106 and the electronic apparatus 102 as two separate entities. In certain embodiments, the functionalities of the server 106 can be incorporated in its entirety or at least partially in the electronic apparatus 102, without a departure from the scope of the disclosure.

The communication network 108 may include a communication medium through which the electronic apparatus 102, the display device 104, and the server 106 may communicate with each other. The communication network 108 may be a wired or wireless communication network. Examples of the communication network 108 may include, but are not limited to, Internet, a Wireless Fidelity (Wi-Fi) network, a Personal Area Network (PAN), a Local Area Network (LAN), or a Metropolitan Area Network (MAN). The electronic apparatus 102, the display device 104, and the server 106 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The 3D object detection model 110 may be a machine learning model, which may be trained on an object detection task to detect 3D objects in 3D data (e.g., a 3D point cloud frame or a point cloud sequence). The 3D object detection model 110 may be defined by its hyper-parameters, for example, activation function(s), a number of weights, a cost function, a regularization function, an input size, a number of layers, and the like.

The 3D object detection model 110 may be referred to as a computational network or a system of artificial neurons. The nodes of the 3D object detection model 110 may be arranged in a plurality of layers, as defined by a neural network topology of the 3D object detection model 110. The plurality of layers of the 3D object detection model 110 may include an input layer, one or more hidden layers, and an output layer. Each layer of the plurality of layers may include one or more nodes (or artificial neurons). Outputs of all nodes in the input layer may be coupled to at least one node of hidden layer(s). Similarly, inputs of each hidden layer may be coupled to outputs of at least one node in other layers of the 3D object detection model 110. Outputs of each hidden layer may be coupled to inputs of at least one node in other layers of the 3D object detection model 110. Node(s) in the final layer may receive inputs from at least one hidden layer to output a result. The number of layers and the number of nodes in each layer may be determined from the hyper-parameters of the 3D object detection model 110. Such hyper-parameters may be set before or after training the 3D object detection model 110 on a training dataset of 3D data.

Each node of the 3D object detection model 110 may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the 3D object detection model 110. All or some of the nodes of the 3D object detection model 110 may correspond to same or a different mathematical function.

In training of the 3D object detection model 110, one or more parameters of each node of the 3D object detection model 110 may be updated based on whether an output of the final layer for a given input (from the training dataset) matches a correct result based on a loss function for the 3D object detection model 110. The above process may be repeated for same or a different input until a minima of loss function is achieved, and a training error is minimized. Several methods for training are known in the art, for example, gradient descent, stochastic gradient descent, batch gradient descent, gradient boost, meta-heuristics, and the like.

In an embodiment, the 3D object detection model 110 may include electronic data, which may be implemented as, for example, a software component of an application executable on the electronic apparatus 102. The 3D object detection model 110 may rely on libraries, external scripts, or other logic/instructions for execution by a processing device, such as the electronic apparatus 102. The 3D object detection model 110 may include computer-executable codes or routines to enable a computing device, such as the electronic apparatus 102 to perform one or more operations to detect 3D objects in the 3D data. Additionally, or alternatively, the 3D object detection model 110 may be implemented using hardware including a processor, a microprocessor (e.g., to perform or control performance of one or more operations), a field-programmable gate array (FPGA), or an application-specific integrated circuit (ASIC). For example, an inference accelerator chip may be included in the electronic apparatus 102 to accelerate computations of the 3D object detection model 110 for 3D the object detection task. In some embodiments, the 3D object detection model 110 may be implemented using a combination of both hardware and software.

Examples of the 3D object detection model 110 may include, but are not limited to, an artificial neural network (ANN), a convolutional neural network (CNN), Regions with CNN (R-CNN), Fast R-CNN, Faster R-CNN, a You Only Look Once (YOLO) network for 3D data, a Residual Neural Network (Res-Net), a Feature Pyramid Network (FPN), a Retina-Net, a Single Shot Detector (SSD), a point net, a voxel net, and/or a combination thereof.

The regression model 112 may be a machine learning (ML) model (initially untrained) that may be trained to identify a relationship between inputs, such as segmentation features that may be based on variations of the 3D data and outputs such as 3D object detection results corresponding to such variations of the 3D data. The trained regression model 112 may be used for a determination of weight values for data blocks of the 3D data. A data block may be referred to as a sample of 3D information within a cubical region of the 3D data, obtained after partitioning the 3D data into a plurality of cubical regions. The weight values may be determined by fitting the regression model 112 on the inputs and the outputs. The weight value for each data block may indicate a weightage of the corresponding data block in a 3D object detection result. The regression model 112 may be defined by its hyper-parameters, for example, a number of weights, a cost function, an input size, a number of layers, and the like. The parameters of the regression model 112 may be tuned and weights (i.e., the weight values) may be updated so as to move towards a global minima of a cost function for the regression model 112.

The regression model 112 may include electronic data, which may be implemented as, for example, a software component of an application executable on the electronic apparatus 102. The regression model 112 may rely on libraries, external scripts, or other logic/instructions for execution by a processing device (such as the electronic apparatus 102). Additionally, or alternatively, the regression model 112 may be implemented using hardware including a processor, a microprocessor (e.g., to perform or control performance of one or more operations), a FPGA, or an ASIC. Alternatively, in some embodiments, the ML model may be implemented using a combination of hardware and software.

In operation, the electronic apparatus 102 may be configured to receive a user input from the user 114. The user input may trigger an acquisition of an input 3D data frame 116 (i.e., 3D data). The 3D data may be, for example, a 3D point cloud, a frame of a 3D video, volumetric or voxelized data, RGB-D data, or a 3D mesh. The input 3D data frame 116 may be associated with a 3D environment that may include a 3D object 118 (for example, a cup). For example, the input 3D data frame 116 may be a 3D point cloud frame. The 3D environment may be a static environment that may include a plurality of 3D objects. The 3D object 118 may be one of the plurality of 3D objects and may be an object of interest. The input 3D data frame 116 may include 3D points that may represent the geometry of each 3D object (including the 3D object 118) included in the 3D point cloud frame. In accordance with an embodiment, the electronic apparatus 102 may generate the input 3D data frame 116 based on a plurality of images of the 3D environment that may be captured from different viewpoints and depth information associated with the 3D environment.

In some embodiments, the 3D data may correspond to a dynamic environment in which the 3D object 118 may be in a mobile state. The received user input may include a set of 3D point cloud frames, each of which may include the 3D object 118 (or multiple 3D objects). The position of the 3D object 118 may vary across the set of 3D point cloud frames. In some other embodiments, the 3D data may correspond to a static environment in which the 3D object 118 may be in a static state. Each 3D point cloud frame of the set of 3D point cloud frames may be generated based on a set of images or depth map(s) that may be captured by one or more sensors (such as an image sensor or a depth sensor) in a static or mobile state. In these or other embodiments, the position of the image sensors may remain same or may vary at different time-instants.

The electronic apparatus 102 may be further configured to partition the acquired input 3D data frame 116 (i.e., the 3D data) into a set of data blocks. In accordance with an embodiment, the input 3D data frame 116 (i.e., the 3D data) may be partitioned using a 3D window-based segmentation function. The 3D window-based segmentation function may segment the input 3D data frame 116 based on a window size. The window size may be selected based on dimensions (such as number of 3D points) associated with the input 3D data frame 116 (such as a 3D point cloud frame), a resolution of the input 3D data frame 116, and bounding box coordinates that may be used to render an object detection result. In accordance with an embodiment, the electronic apparatus 102 may partition the input 3D data frame 116 into a set of cuboids. Each cuboid may be representative of a data block of the set of data blocks. In some embodiments, the input 3D data frame 116 may be partitioned using a 3D polygon-based segmentation function or a 3D voxel-based segmentation function. The 3D polygon-based segmentation may partition the input 3D data frame 116 into a set of polygons and create segments of polygons by combining "K" polygons of the set of polygons in each segment. On the other hand, the 3D voxel-based segmentation function may partition the input 3D data frame 116 into a set of voxels and, thereafter, create segments of voxels by combining "K" voxels of the set of voxels in each segment. Each segment may be representative of a data block of the set of data blocks. For example, the electronic apparatus 102 may partition the input 3D data frame 116 into 343 cuboids. In such as example, the set of data blocks may include 343 data blocks. The input 3D data frame 116 may be partitioned into the set of data blocks to perform a block-wise search for a detection of the 3D object 118 in the data blocks of the set of data blocks.

The electronic apparatus 102 may be further configured to generate variations of the input 3D data frame 116 (i.e., the 3D data) based on a modification of the set of data blocks. In accordance with an embodiment, the modification may include a random selection of a subset of data blocks of the set of data blocks and a subsequent removal of the selected subset of data blocks from the input 3D data frame 116. For example, five variations of the input 3D data frame 116 may be generated based on five modifications of the set of data blocks. For generation of each variation of the input 3D data frame 116, any number of data blocks may be randomly selected and removed from the input 3D data frame 116. The selected subset of data blocks may be removed for generation of each variation of the generated variations may be different. The variations of the input 3D data frame 116 may be generated to obtain different object detection results based on application of the 3D object detection model 110 on each variation.

The electronic apparatus 102 may be further configured to generate 3D object detection results that may correspond to the generated variations of the input 3D data frame 116. The 3D object detection results may be generated based on a sequential application of the 3D object detection model 110 on the generated variations of the input 3D data frame 116. For example, five object detection results may be generated based on five variations of the input 3D data frame 116. In accordance with an embodiment, the each of the generated variations of the input 3D data frame 116 may be received at the input layer of the 3D object detection model 110. An object detection result, corresponding to each variation of the input 3D data frame 116, may be obtained at the output layer of the 3D object detection model 110. The object detection result may include information that describes a 3D bounding box (such as the 3D bounding box 120) for the 3D object 118.

The object detection result may also include an object score and a class score for the 3D object 118. In accordance with an embodiment, the object score may specify a confidence of the 3D object detection model 110 in detection of the 3D object 118 (i.e., the cup) in the input 3D data frame 116. The confidence score may be specified as a value between "0" and "1". The class score may depend on a number of class labels that the 3D object detection model 110 is trained to recognize. For example, the 3D object detection model 110 may be trained to recognize a detected 3D object as belonging to a particular class. The class labels may be, for example, a cup object class, a fruit object class, or a ball object class. The 3D object detection model 110 may recognize the 3D object 118 as belonging to the cup object class bases on class scores of the class labels. The class score may be 1 (or close to 1) for the cup object class and 0 (or close to 0) for each of the fruit object class and the ball object class.

The electronic apparatus 102 may be further configured to train a regression model 112 based on the 3D object detection results. The training of the regression model 112 may include determination of coefficients of the regression model 112 based on a set of input variables and a set of output variables. Each input variable of the set of input variables may include a segmentation feature that corresponds to a generated variation of the input 3D data frame 116. For each variation, the segmentation feature may be a 1-D vector that indicate each removed data block (i.e., the randomly selected data block for removal from the input 3D data frame 116 for the generation of the variation of input 3D data frame 116) with a '0' and each retained data block (i.e., a data block included in the variation of input 3D data frame 116) with a '1'. Further, each output variable of the set of output variables may include an object detection result corresponding to each variation of the input 3D data frame 116 obtained at the output layer of the 3D object detection model 110. In accordance with an embodiment, the training of the regression model 112 may involve fitting the regression model 112 on the set of input variables and the set of output variables to determine relationships between each of the input variables and each of the corresponding output variables. The determined relationships may correspond to the coefficients of the regression model 112.

The electronic apparatus 102 may be further configured to determine a weight value that may indicate a likelihood that a data block of the set of data blocks belongs to the 3D object 118. The weight value may be determined for each data block of the set of data blocks. The determination may be based on the trained regression model 112. In accordance with an embodiment, the weight value for each data block of the set of data blocks may correspond to a coefficient of the trained regression model 112. The weight value for a particular data block of the set of data blocks, may be directly proportional to the likelihood that the data block belongs to the 3D object 118. The likelihood of the 3D object 118 belonging to the data block may be determined based on object detection results corresponding to each of the generated variations of the input 3D data frame 116 that may include the data block. The data block may belong to the 3D object 118 if a portion of the 3D object 118 is detected (by the 3D object detection model 110) in the data block (included in the generated variations of the input 3D data frame 116). Thus, weight values for data blocks belonging to the 3D object 118 may be higher compared to weight values for data blocks that may not belong to the 3D object 118.

The electronic apparatus 102 may be further configured to generate a 3D visualization frame 122 that may include a first 3D heatmap visualization 124 of the 3D object 118 (included in the input 3D data frame 116 (i.e., the 3D data)) based on the determined weight value for each data block of the set of data blocks. The first 3D heatmap visualization 124 may indicate regions of the 3D visualization frame 122 (or the 3D data 116) that may include the 3D object 118. The regions may correspond to data blocks may be inside the 3D bounding box 120. In accordance with an embodiment, the electronic apparatus 102 may render the first 3D heatmap visualization 124 by filling each data block inside the 3D bounding box 120 with a particular color. The color used to fill each data block may depend on the weight value for the corresponding data block. For example, 27 data blocks of the set of data blocks may be inside the 3D bounding box 120 and each data block (of the 27 data blocks) may be filled with a color based on a weight value for the corresponding data block. The electronic apparatus 102 may select a color to fill a particular data block as per a color scheme. The color scheme may be such that a color of a higher temperature (such as red, pink, orange, or yellow) may be used to fill a data block (i.e., a data block of the 27 data blocks) for which the weight value is high. Whereas a color of a higher temperature (such as blue, green, or violet) may be used to fill a data block (i.e., a data block of the 27 data blocks) for which the weight value is low. The first 3D heatmap visualization 124 may enable (the user 114) to visualize 3D object detection results generated by the 3D object detection model 110.

Figure 2:
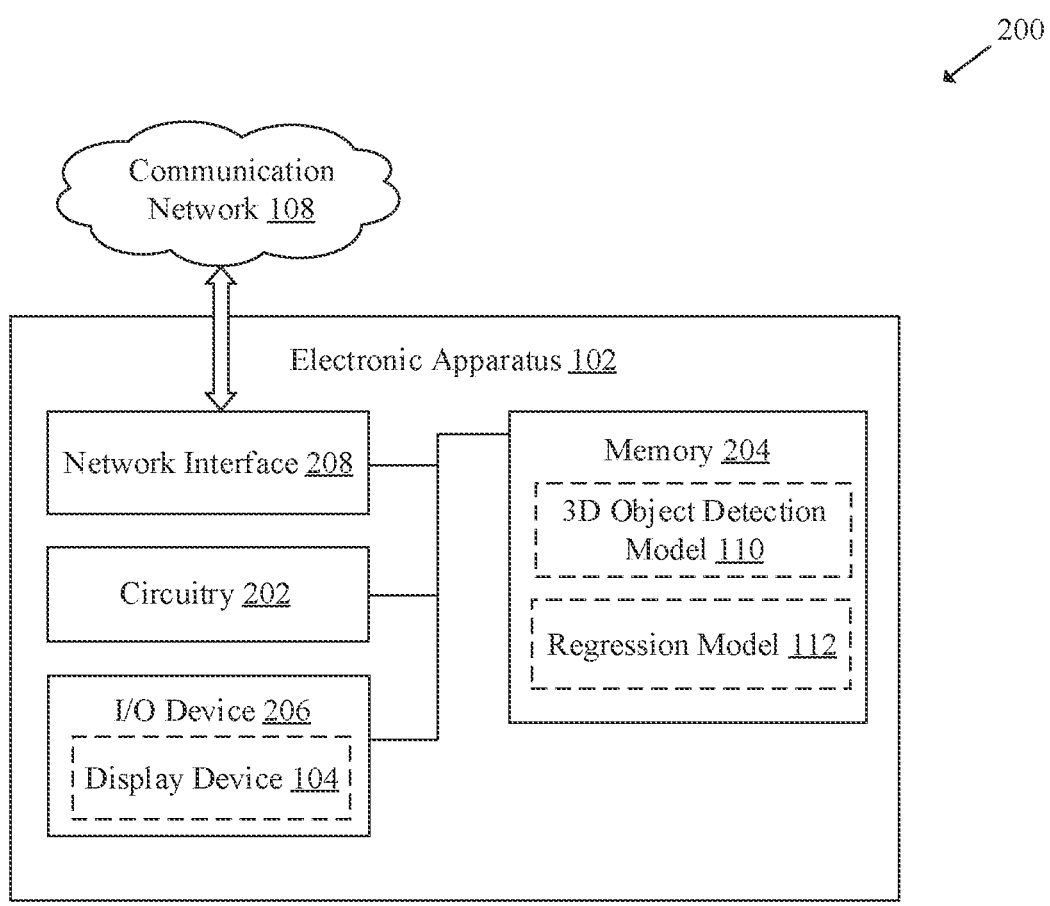
FIG. 2 is a block diagram that illustrates an exemplary electronic apparatus for visualization of AI-generated predictions from 3D data, in accordance with an embodiment of the disclosure.

FIG. 2 is a block diagram that illustrates an exemplary electronic apparatus for visualization of AI-generated predictions from 3D data, in accordance with an embodiment of the disclosure. FIG. 2 is explained in conjunction with elements from FIG. 1. With reference to FIG. 2, there is shown a block diagram 200 of electronic apparatus 102. The electronic apparatus 102 may include circuitry 202, a memory 204, an input/output (I/O) device 206, and a network interface 208. In at least one embodiment, the I/O device 206 may also include the display device 104. The circuitry 202 may be communicatively coupled to the memory 204, the I/O device 206, and the network interface 208, through wired or wireless communication of the electronic apparatus 102.

The circuitry 202 may include suitable logic, circuitry, and interfaces that may be configured to execute program instructions associated with as a set of operations to be executed by the electronic apparatus 102. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, and/or interfaces that may be configured to store instructions executable by the circuitry 202. The memory 204 may be configured to store operating systems and associated applications. In at least one embodiment, the memory 204 may be configured to store the 3D object detection model 110 and the regression model 112. The memory 204 may further store the acquired 3D data, the generated variations of the 3D data, the generated 3D object detection results (that may be obtained as output from the 3D object detection model 110), the weight value of each data block of the set of 3D blocks, and the first 3D heatmap visualization (that may be included in a visualization frame generated based on the determined weights). Example implementations of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive a user input that may trigger the acquisition, by the circuitry 202, of the 3D data associated with the 3D environment that includes the 3D object. The I/O device 206 may be further configured to render the acquired 3D data, the generated variations of the 3D data, the generated 3D object detection results, and the first 3D heatmap visualization of the 3D object detection results. The I/O device 206 may include various input and output devices, which may be configured to communicate with the circuitry 202. Examples of the input devices may include, but are not limited to, a touch screen, a keyboard, a mouse, a joystick, and/or a microphone. Examples of the output devices may include, but are not limited to, the display device 210.

The network interface 208 may include suitable logic, circuitry, interfaces, and/or code that may be configured to establish a communication link between the electronic apparatus 102, the display device 104, and the server 106, via the communication network 108. The network interface 208 may be implemented by use of various known technologies to support wired or wireless communication of the electronic apparatus 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 208 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), Wi-MAX, a protocol for email, instant messaging, and/or Short Message Service (SMS).

The operations executed by the electronic apparatus 102, as described in FIG. 1, may be performed by the circuitry 202. Operations executed by the circuitry 202 are described in detail, for example, in FIGS. 3A, 3B, 4, and 5.

Figure 3A:
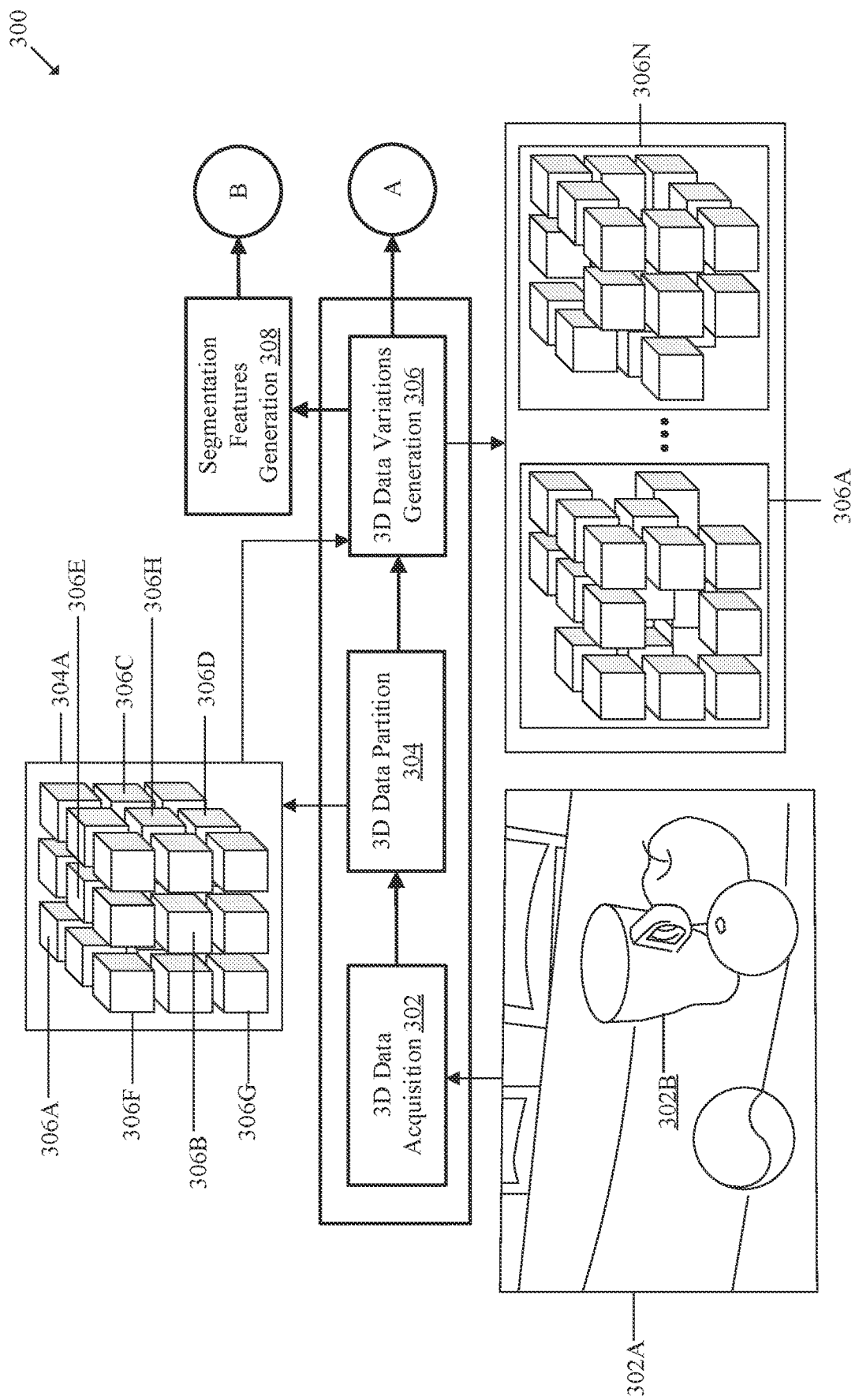
FIGS. 3A and 3B are diagrams that collectively illustrate an exemplary execution pipeline for visualization of AI-generated predictions from 3D data, in accordance with an embodiment of the disclosure.
Figure 3B:
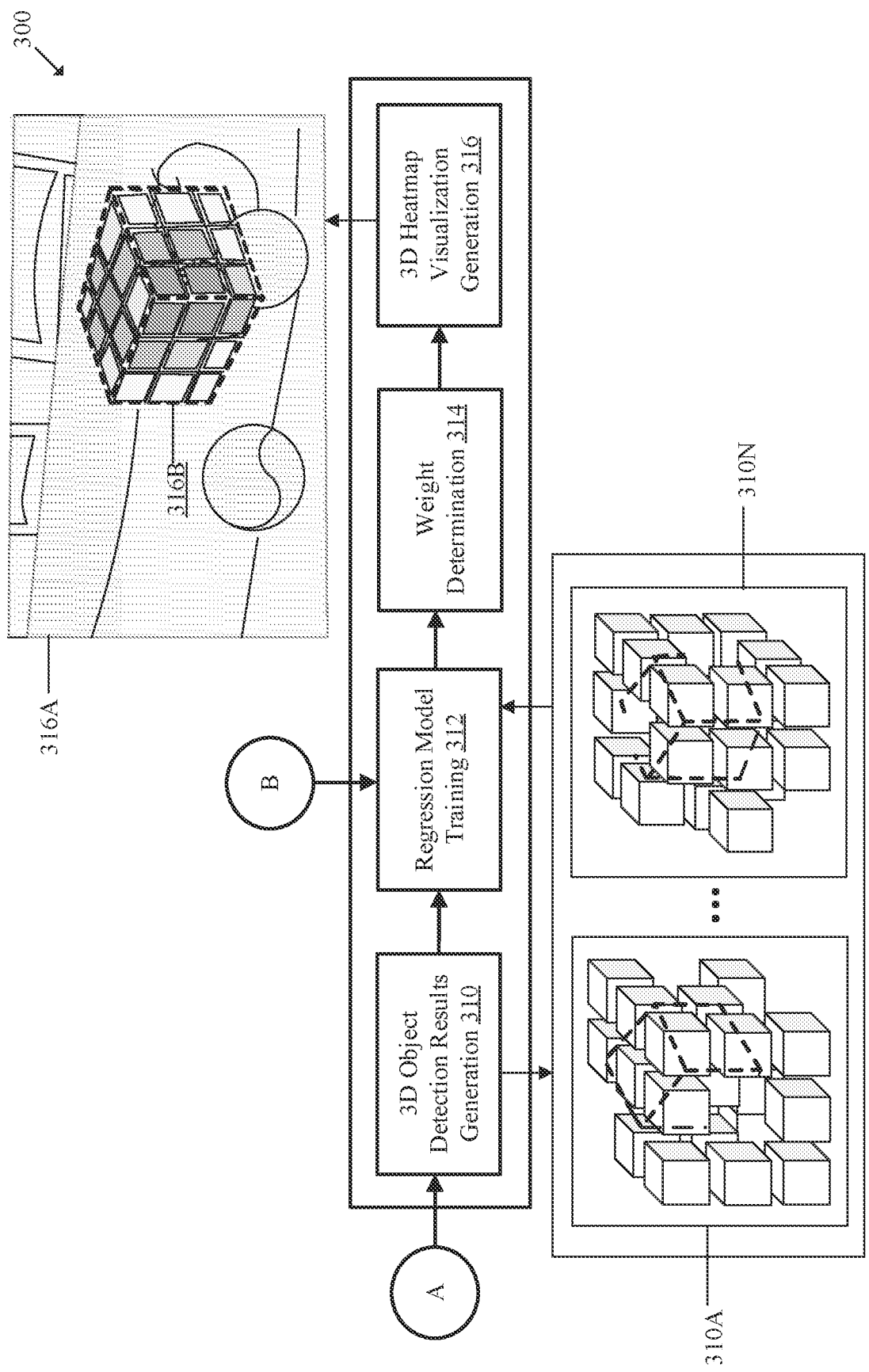

FIGS. 3A and 3B are diagrams that collectively illustrate an exemplary execution pipeline for a visualization of AI-generated predictions from 3D data, in accordance with an embodiment of the disclosure. FIGS. 3A and 3B are explained in conjunction with elements from FIG. 1 and FIG. 2. With reference to FIGS. 3A and 3B, there is shown an exemplary execution pipeline 300. In the exemplary execution pipeline 300, there is shown a sequence of operations for visualization of AI-generated predictions from 3D data. The sequence of operations that may start from 302 and end at 316. The sequence of operations may be executed by the circuitry 202 of the electronic apparatus 102.

At 302, 3D data 302A associated with a 3D environment may be acquired. In at least one embodiment, the circuitry 202 may be configured to acquire the 3D data 302A associated with the 3D environment that includes one or more 3D objects. The 3D environment may be a static environment that includes static 3D objects (such as a table, a ball, a cup, and two fruits). Alternatively, the 3D environment may be a dynamic environment that includes fixed and/or moving 3D objects. The circuitry 202 may acquire a single 3D frame or a set of 3D frames from the 3D environment for the acquisition of the 3D data 302A. If a set of 3D frames is acquired (instead of the single 3D frame), then a 3D frame may be selected from the acquired set of 3D frames for the acquisition of the 3D data 302A. The 3D data 302A may be a 3D point cloud, a 3D video, a volumetric data, or a 3D mesh. A 3D object 302B of the one or more 3D objects (included in the 3D data 302A) may be a 3D object of interest. The 3D data 302A is shown to include a single 3D object of interest (i.e., the 3D object 302B) merely as an example and such an example should not be construed as limiting the disclosure. In certain embodiments, the 3D data 302A may include multiple objects of interest.

At 304, the 3D data 302A may be partitioned. In at least one embodiment, the circuitry 202 may be configured to partition the 3D data 302A into a set of data blocks 304A. The partitioning of the 3D data 302A may allow execution of a block-wise search in the set of data blocks 304A for a detection of the object of interest 302B. The 3D data 302A may be partitioned based on a 3D window-based segmentation function. Specifically, the 3D window-based segmentation function may be applied on the 3D data 302A to segment (i.e., partition) the 3D data 302A into the set of data blocks 304A. The size of each data block of the set of data blocks 304A may depend on a window size of the 3D window-based segmentation function.

The circuitry 202 may be configured to select the window size based on an input dimension (for example, a resolution of a 3D point cloud and a number of 3D points in the 3D point cloud) of the 3D data 302A (if the 3D data 302A is a point cloud frame) and bounding box coordinates of the 3D data 302A which may define the boundaries of each data block of the set of data blocks 304A. The coordinates of at least one common edge of neighboring bounding boxes of neighboring data blocks may be identical. In accordance with an embodiment, the 3D-window segmentation function may segment (i.e., partition) the 3D data 302A into a set of cuboids. Each cuboid of the set of cuboids may correspond to a data block of the set of data blocks. The object of interest 302B may be included in one or more cuboids (i.e., data blocks) based on a size of the cuboid.

In some embodiments, the 3D data 302A may be partitioned using a 3D polygon-based segmentation function or a 3D voxel-based segmentation function. The 3D polygon-based segmentation function may segment the 3D data 302A into a set of polygons. Thereafter, polygons of the set of polygons may be grouped such that a predefined number of subsets of polygons are generated, and each subset includes "K" polygons. Thereafter, "K" polygons in each subset may be combined into a segment. The segment may represent a data block of the set of data blocks 304A. On the other hand, the 3D voxel-based segmentation function may segment the 3D data 302A into a set of voxels. Thereafter, voxels of the set of voxels may be grouped such that a predefined number of subsets of voxels are generated, and each subset may include "K" voxels. Thereafter, "K" voxels in each subset may be combined into a segment. The segment may represent a data block of the set of data blocks 304A.

At 306, a set of variations 306A . . . 306N of the 3D data 302A may be generated. In at least one embodiment, the circuitry 202 may be configured to generate the set of variations 306A . . . 306N of the 3D data 302A based on a modification of the set of data blocks 304A. The circuitry 202 may generate a set of "N" variations 306A . . . 306N of the 3D data 302A based on "N" modifications of the set of data blocks 304A. Each modification may include a random selection of a subset of data blocks from the set of data blocks 304A and a subsequent removal of the selected subset of data blocks from the set of data blocks 304A. Based on the corresponding modification, a variation of the set of variations 306A . . . 306N may be generated. The selection of subsets of data blocks (for removal from the set of data blocks 304A) may be different in each modification, which may lead to generation of distinct variations (i.e., 306A . . . 306N) of the 3D data 302A.

For example, the circuitry 202 may randomly select a subset of data blocks 306A-306D (i.e., 306A, 306B, 306C, and 306D) of the set of data blocks 304A (of the 3D data 302A). The selected subset of data blocks 306A-306D may be removed from the set of data blocks 304A for a modification of the set of data blocks 304A. The modification may result in the generation of the variation 306A of the 3D data 302A. Similarly, a subset of data blocks 306E-306H (i.e., 306E, 306F, 306G, and 306H) of the set of data blocks 304A may be randomly selected. The subset of data blocks 306E-306H may be removed from the set of data blocks 304A to modify the set of data blocks 304A and generate the variation 306N of the 3D data 302A.

At 308, segmentation features may be generated. In at least one embodiment, the circuitry 202 may be configured to generate segmentation features corresponding to each variation of the generated set of variations 306A . . . 306N of the 3D data 302A. The segmentation features may be generated based on a size of the set of the data blocks 304A and the modification of the set of data blocks 304A. Each of the segmentation features may be a feature vector. The circuitry 202 may generate "N" feature vectors since "N" variations (i.e., 306A . . . 306N) of the 3D data 302A may be generated based on "N" modifications of the set of data blocks 304A, and each feature vector may correspond to a variation of the 3D data 302A. Each feature vector may include a set of values. The size of the set of values may be equal to a count of data blocks in the set of the data blocks 304A (i.e., the size of the set of the data blocks 304A). Each value may indicate whether a data block of the set of data blocks 304A is included in the variation. For example, the count of data blocks of the set of the data blocks 304A (or the size of the set of the data blocks 304A) may be 540. The set of the data blocks 304A may be obtained based on a partitioning of the 3D data 302A into 540 segments. Thus, the count of values included in each feature vector (or a number of dimensions of the feature vector) corresponding to each variation of the generated set of variations 306A . . . 306N may be 540. Each value of a feature vector that corresponds to a generated variation (for example, the variation 306A) may be a "0" or "1". The value may be "1" if a data block of the set of data blocks 304A is included in the generated variation 306A. Whereas the value may be "0" if the data block of the set of data blocks 304A is removed during the modification of the set of data blocks 304A to generate the variation 306A. Further, if 80 data blocks, out of the 540 data blocks are removed to generate the variation 306A, then 80 values of the feature vector corresponding to the variation 306A may be "0", while remaining 460 values of the feature vector may be "1". Values in the feature vectors corresponding to other variations of the generated set of variations 306A . . . 306N may be similarly generated.

At 310, a set of 3D object detection results 310A . . . 310N may be generated. In at least one embodiment, the circuitry 202 may be configured to generate the 3D object detection results 310A . . . 310N based on a sequential application of the 3D object detection model 110 on the generated set of variations 306A . . . 306N. The set of 3D object detection results 310A . . . 310N may correspond to the set of variations 306A . . . 306N of the 3D data 302A. For example, the 3D object detection result 310A may correspond to the variation 306A of the 3D data 302A. Similarly, the 3D object detection result 310N may correspond to the variation 306N of the 3D data 302A.

Each 3D object detection result of the generated set of 3D object detection results 310A . . . 310N may include a 3D bounding box for the 3D object 302B. For example, the object detection result 310A may include coordinates of a first 3D bounding box on the set of data blocks 304A. The first 3D bounding box may completely or partially include the 3D object 302B. To predict the coordinates of the first bounding box, the 3D object detection model 110 may be configured to initially determine whether the 3D object 302B is included in the variation 306A. For example, the determination may be based on application of the 3D object detection model 110 on each of the data blocks of the set of data blocks 304A included in the variation 306A. The data blocks may be retained after the modification of the set of data blocks 304A (for the generation of the variation 306A). The circuitry 202 may determine that the 3D object 302B is included in the variation 306A if an object score associated with the 3D object 302B in the variation 306A is greater than a threshold score. Once the 3D object 302B is determined to be included in the variation 306A (based on the object score), the 3D object detection model 110 may predict the coordinates of the first 3D bounding box for the 3D object 302B on a subset of data blocks included in the variation 306A. The subset of data blocks and data blocks enclosed by the subset of data blocks may include the 3D object 302B. Thereafter, the 3D object detection result 310A may be generated. The 3D object detection result 310A may include the object score associated with the 3D object 302B in the variation 306A and the predicted coordinates of the first 3D bounding box. Similarly, coordinates of other 3D bounding boxes for the 3D object 302B may be predicted on subsets of data blocks included in the variations 306B . . . 306N. The coordinates may be predicted based on a determination that the 3D object 302B is present in the variations 306B . . . 306N. The determination may be based on, for example, an application of the 3D object detection model 110 on each data block of the set of data blocks 304A that may be included in the respective variations 306B . . . 306N.

Once the object detection result 310A is generated, the circuitry 202 may apply the 3D object detection model 110 on each data block of the set of data blocks 304A that may be included in the variation 306B. Based on the application, the circuitry 202 may determine an object score associated with the 3D object 302B in the variation 306B. The 3D object 302B may be determined to be included in the variation 306B if the object score is determined to be greater than the threshold score. Thereafter, the 3D object detection model 110 may predict coordinates of a second 3D bounding box on a subset of data blocks of the set of data blocks 304A included in the variation 306B. The subset of data blocks and data blocks enclosed by the subset of data blocks may include the 3D object 302B. The second 3D bounding box may completely or partially include the 3D object 302B. The object detection result 310B may include the object score associated with the 3D object 302B in the variation 306B and the predicted coordinates of the second 3D bounding box for the 3D object 302B. Similarly, the circuitry 202 may apply the 3D object detection model 110 on each data block of the set of data blocks 304A that may be included in the variation 306N. Based on the application, the circuitry 202 may determine an object score associated with the 3D object 302B in the variation 306N. The 3D object 302B may be determined to be included in the variation 306N if the object score is determined to be greater than the threshold score. Thereafter, the 3D object detection model 110 may predict coordinates of a $N^{th}$ 3D bounding box on a subset of data blocks of the set of data blocks 304A included in the variation 306N. The subset of data blocks and data blocks enclosed by the subset of data blocks may include the 3D object 302B. Therefore, the $N^{th}$ 3D bounding box may completely or partially include the 3D object 302B. The object detection result 310N may include the object score associated with the 3D object 302N in the variation 306N and the predicted coordinates of the $N^{th}$ 3D bounding box for the 3D object 302B.

In accordance with an embodiment, the circuitry 202 may be further configured to track, from a plurality of neural network nodes in the 3D object detection model 110, one or more neural network nodes which may be responsible for the generation of the set of 3D object detection results 310A . . . 310N. Prior to the generation of the set of 3D object detection results 310A . . . 310N, the circuitry 202 may apply the 3D object detection model 110 on the 3D data 302A to generate an object detection result. The object detection result may include a bounding box (for example, the 3D bounding box 120) for the 3D object 302B. The circuitry 202 may determine, from a plurality of activation nodes of the 3D object detection model 110, an activation node that may be responsible for the object detection result. Thereafter, a node anchor plugin corresponding to the activation node may be selected as a reference point. Once the 3D object detection result 310A is generated, a first activation node responsible for generation of the 3D object detection result 310A may be determined and a node anchor plugin corresponding to the first activation node may be selected as the reference point. Similarly, upon generation of the 3D object detection result 310N, a $N^{th}$ activation node responsible for generation of the 3D object detection result 310N may be determined and a node anchor plugin that corresponds to the $N^{th}$ activation node may be selected as the reference point. Thus, the selection of the reference point may be updated after the generation of each 3D object detection result of the set of 3D object detection results 310A . . . 310N. The circuitry 202 may track the updates.

At 312, the regression model 112 may be trained. In at least one embodiment, the circuitry 202 may be configured to train the regression model 112 based on the set of 3D object detection results 310A . . . 310N. The regression model 112 may be trained further based on the segmentation features (i.e., the feature vector) corresponding to each variation of the generated set of variations 306A . . . 306N of the 3D data 302A. The training may include determination of values of coefficients of the regression model 112. The values of the coefficients of the regression model 112 may be determined by fitting the regression model 112 on a set of input variables and a set of output labels. The set of input variables (or set of independent variables) may include a set of feature vectors that correspond to the generated set of variations 306A . . . 306N. The set of output labels may include the set of 3D object detection results 310A . . . 310N obtained based on applications of the 3D object detection model 110 on the generated set of variations 306A . . . 306N. To fit the regression model 112, the circuitry 202 may be configured to minimize a cost function that may be associated with the regression model 112. The coefficients of the regression model 112 that may be obtained based on the fitting may be used to identify a relationship between a feature vector corresponding to each variation (for example, the variation 306A) and a 3D object detection result (for example, the 3D object detection result 310A) obtained based on an application of the 3D object detection model 110 on the corresponding variation (i.e., the variation 306A). In accordance with an embodiment, the determined coefficients of the trained regression model 112 may correspond to weight values for respective data blocks of the set of data blocks 304A.

At 314, a weight value for each data block of the set of data blocks 304A may be determined. In at least one embodiment, the circuitry 202 may be configured to determine the weight value for each data block of the set of data blocks 304A based on the trained regression model 112. The weight value for each data block may correspond to a coefficient of the trained regression model 112 and may indicate a likelihood that the data block belongs to the 3D object 302B. Thus, a higher weight value may increase the likelihood that the data block belongs to the 3D object 302B. Whereas a lower weight value may reduce the likelihood that the data block belongs to the 3D object 302B.

The weight value for the data block may be high if the data block is included in a majority of variations of the 3D data (i.e., the generated set of variations 306A . . . 306N) and associated with high-value coefficients of the trained regression model 112. The data block may be associated a high-value coefficient if the data block belongs to the 3D object 302B. The circuitry 202 may determine that the data block belongs to the 3D object 302B based on prediction (by the 3D object detection model 110) of coordinates of at least one 3D bounding box (of the "N" 3D bounding boxes) on the data block. The determination may be further based on enclosure of the data block by one or more data blocks (of the set of data blocks 304A) on which the coordinates of the at least one 3D bounding box may be predicted. The at least one 3D bounding box may fully or partially enclose the 3D object 302B and may be included in at least one 3D object detection result of the set of 3D object detection results 310A . . . 310N. Thus, a high weight value for a data block and association of the data block with a high-value coefficient of the regression model 112 may indicate that the data block belongs to the 3D object 302B.

At 316, a 3D heatmap visualization frame 316A may be generated. In at least one embodiment, the circuitry 202 may be configured to generate the 3D heatmap visualization frame 316A that may include a first 3D heatmap visualization 316B of the 3D object 302B (i.e., the object of interest) included in the 3D data 302A. The first 3D heatmap visualization 316B may serve as an explanation of a 3D object detection result predicted by the 3D object detection model 110 and may enable the user 114 to visualize the predicted 3D object detection result. The 3D heatmap visualization frame 316A may be generated based on the determined weight value for each data block of the set of data blocks 304A. The first 3D heatmap visualization 316B may include a subset of data blocks of the set of data blocks 304A that belong to the 3D object 302B in the 3D data 302A. The subset of data blocks may be enclosed by a final 3D bounding box. The coordinates of the final 3D bounding box may be determined based on the predicted coordinates of each of the "N" 3D bounding boxes included in the generated set of 3D object detection results 310A . . . 310N. Each data block of the subset of data blocks may be represented by a cuboid and the final 3D bounding box may be represented by a cuboid that encloses all cuboids representative of the data blocks of the subset of data blocks. However, in some scenarios, some data blocks of the set of data blocks 304A that belong to the 3D object 302B may not be enclosed by the final 3D bounding box and some data blocks of the set of data blocks 304A that do not belong to the 3D object 302B may be enclosed by the final 3D bounding box. Such scenarios may help a user to identify object detection errors via the first 3D heatmap visualization 316B. In some instances, such errors may indicate defects in the 3D object 302B. In industrial applications, the errors may be used to measure a quality of a product at any given stage.

In accordance with an embodiment, the circuitry 202 may be configured to select a color to fill each data block of the subset of data blocks included in the first 3D heatmap visualization 316B. The selection of color may be based on a color scheme and the weight value for each data block of the subset of data blocks. The color scheme may include a set of colors of various temperatures that may fall within a temperature range. Each color of the set of colors may be mapped to a weight value. For example, a data block of the subset of data blocks may be filled with a warmer color (such as yellow, orange, or red) if the weight value for the data block is high. Similarly, a data block of the subset of data blocks may be filled with a cooler color (such as blue, green, or violet) if the weight value for the data block is low. Some data blocks of the subset of data blocks may be filled with shades of warmer or cooler colors based on the weight values for the data blocks. The circuitry 202 may be further configured to control the display device 104 to render the first 3D heatmap visualization 316B. The generated 3D heatmap visualization frame 316A may also include other 3D heatmap visualizations (such as a second 3D heatmap visualization) of other 3D objects of interest that may be included in the 3D data 302A.

In accordance with an embodiment, circuitry 202 may be configured to determine a first count of first weight values which are greater than zero and are inside the 3D bounding box. The first count of first weight values may be indicative of a count of first data blocks of the subset of data blocks that belong to the 3D object 302B and the (first) weight values for each of the first data blocks may be greater than zero. The first count may be determined based on a comparison of the weight value for each first data block of the set of data blocks 304A with a weight threshold. The circuitry 202 may further determine a second count based on a summation of the first count and a count of second weight values. The second weight values may be equal to zero inside the 3D bounding box and the count of second weight values may be determined based on the comparison. The count of second weight values may be indicative of a count of second data blocks of the subset of data blocks that are inside the 3D bounding box and do not belong to the 3D object 302B. The (second) weight values for each of the second data blocks may be zero. The circuitry 202 may further compute a first visual metric as a ratio of the first count to the second count. The first visual metric may quantify a portion of the 3D data 302A inside the 3D bounding box that belongs to the 3D object 302B.

The circuitry 202 may further determine a third count based on a summation of the first count and a count of third weight values. The third weight values may be greater than zero and outside the 3D bounding box and the count of third weight values may be determined based on the comparison. The count of third weight values may be indicative of a count of third data blocks of the set of data blocks 304A that are outside the 3D bounding box and do not belong to the 3D object 302B. The (third) weight values for the third data blocks may be greater than zero. The circuitry 202 may further compute a second visual metric as a ratio of the first count to the third count. The second visual metric may quantify a portion of the 3D data 302A belonging to the 3D object 302B that is included inside the 3D bounding box.

Figure 4:
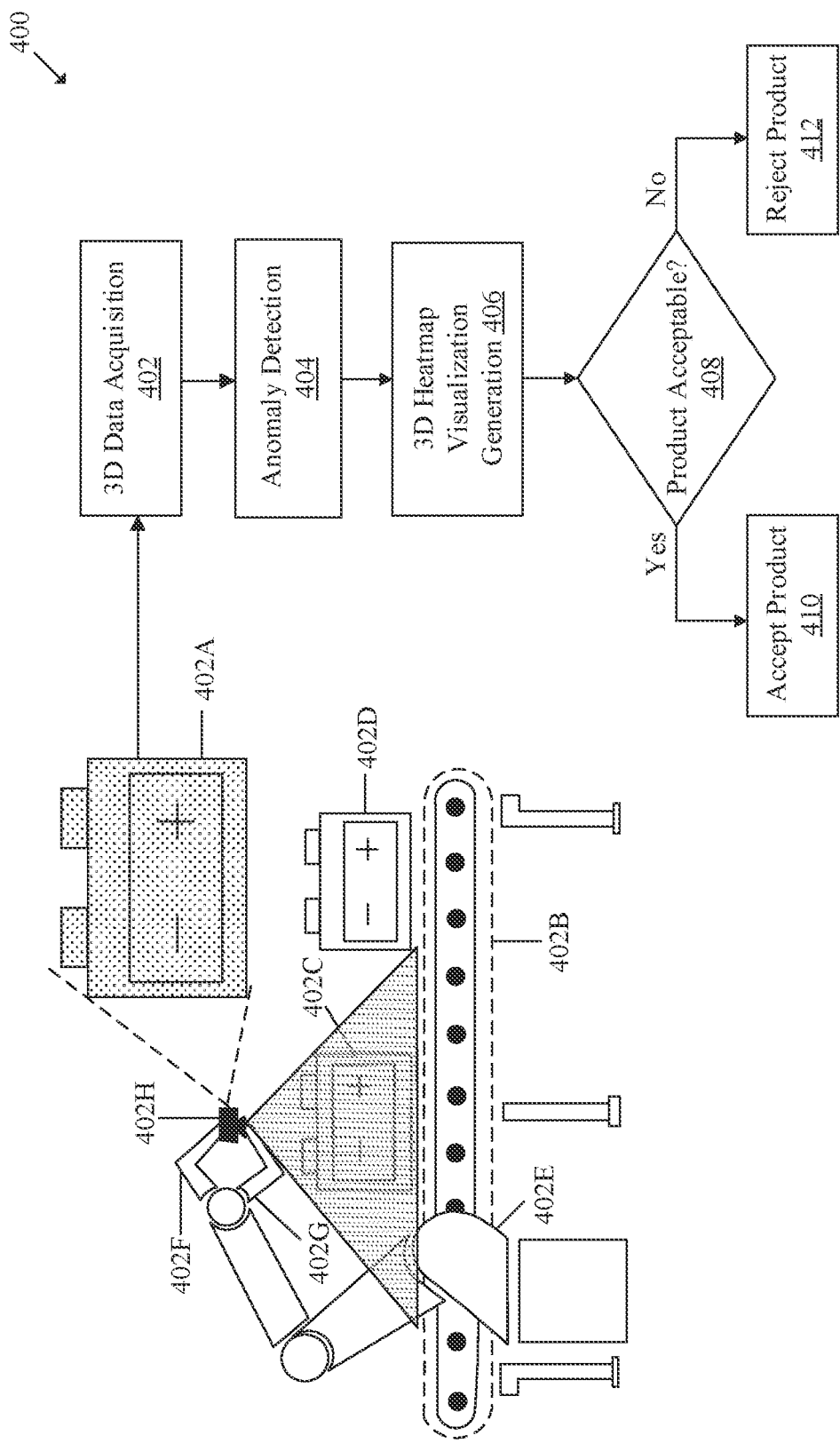
FIG. 4 is a block diagram that illustrates an exemplary scenario for localization of an anomaly detected in a product based on a 3D heatmap visualization of the anomaly, in accordance with an embodiment of the disclosure.

FIG. 4 is a block diagram that illustrates an exemplary scenario for localization of an anomaly detected in a product based on a 3D heatmap visualization of the anomaly, in accordance with an embodiment of the disclosure. FIG. 4 is explained in conjunction with elements from FIG. 1, FIG. 2, FIG. 3A, and FIG. 3B. With reference to FIG. 4, there is shown an exemplary block diagram 400 that illustrates exemplary operations from 402 to 412, as described herein. The exemplary operations illustrated in the exemplary block diagram 400 may start at 402 and may be performed by the circuitry 202 of FIG. 2.

At 402, 3D data 402A (for example, a point cloud) associated with an exemplary 3D environment may be acquired. In at least one embodiment, the circuitry 202 may be configured to acquire the 3D data 402A associated with the exemplary 3D environment that includes 3D objects. The 3D environment may be a production environment where products (such as batteries) are manufactured. The 3D objects included in the production environment include an assembly line 402B, a first product 402C, a second product 402D, and a robotic arm 402E (or a mechanical arm or manipulator). The first product 402C and the second product 402D may be disposed on the assembly line 402B. The robotic arm 402E may include a plurality of segments and each pair of segments of the plurality of segments may be connected to each other by a joint. The plurality of segments may include a first segment 402F and a second segment 402G. The first segment 402F and the second segment 402G may support a sensing unit 402H. The sensing unit 402H may include image capture devices (i.e., imaging sensors) and depth sensors. Based on a movement of the assembly line 402B, products disposed on the assembly line 402B may be within a field-of-view of the sensing unit 402H. At any time instant, the first product 402C may be in the field-of-view of the image capture devices and the depth sensors. The circuitry 202 may be configured to control the sensing unit 402H to capture a plurality of images of the first product 402C and obtain depth information associated with the first product 402C. The plurality of images may be captured from one or more viewpoints using the image capture devices and the depth information may be obtained using the depth sensors. The circuitry 202 be further configured to generate a 3D point cloud, i.e., the 3D data 402A, based on the plurality of images and the depth information. The 3D point cloud (the 3D data 402A) may represent the geometry of the first product 402C using a plurality of 3D points. The 3D data 402A may be acquired for an assessment of a manufacturing quality of the first product 402C. Similarly, a 3D point cloud representative of the geometry of the second product 402D may be generated for assessment of the manufacturing quality of the second product 402D.

At 404, a production-related anomaly in the first product 402C may be detected. In at least one embodiment, the circuitry 202 may be configured to detect the production-related anomaly (for example, a structural defect) in the first product 402C that may be introduced when the first product 402C is manufactured. The production-related anomaly may be an object of interest. After the acquisition of the 3D data 402A, the circuitry 202 may input the 3D data 402A to the input layer of the 3D object detection model 110 and may extract an object detection result associated with the production-related anomaly as an output of the 3D object detection model 110 for the input. The object detection result may indicate that the production-related anomaly is present in the first product 402C. The object detection result may further include coordinates of a 3D bounding box that encloses 3D points belonging to the production-related anomaly in the 3D data 402A.

The object detection result may further include class scores associated with a set of anomaly classes. The circuitry 202 may determine that the first product 402C may include an anomaly (i.e., the production-related anomaly) of a particular class based on a class score associated with the particular class. The class score may be highest amongst the class scores associated with the set of anomaly classes that the 3D object detection model 110 may be trained to recognize. The circuitry 202 may further determine an activation node of the 3D object detection model 110 responsible for the object detection result and may select a node anchor plugin corresponding to the activation node as a reference point.

The circuitry 202 may be configured to partition the 3D data 402A into a set of data blocks and generate a set of variations of the 3D data 402A based on a modification of the set of data blocks. The generated variations of the set of variations of the 3D data 402A may be sequentially provided to the 3D object detection model 110 as inputs. Thereafter, object detection results corresponding to the generated variations may be obtained as outputs. The circuitry 202 may further determine activation nodes of the 3D object detection model 110 responsible for the object detection results. A node anchor plugin corresponding to each activation node of the determined activation nodes may be selected as a reference point, and changes in the selection of the reference point may be tracked. The circuitry 202 may train the regression model 112 based on the object detection results and may determine, using the trained regression model 112, a weight value of each data block of the set of data blocks. The weight value may indicate a likelihood of whether a corresponding data block of the set of data blocks belongs to the anomaly of the particular class (i.e., the production-related anomaly) detected in the first product 402C. The circuitry 202 may determine that a subset of data blocks of the set of data blocks belong to the production-related anomaly.

At 406, a 3D heatmap visualization of the production-related anomaly (i.e., the structural defect) in the point cloud representation (i.e., the 3D data 402A) of the first product 402C may be generated. In at least one embodiment, the circuitry 202 may be configured to generate the 3D heatmap visualization based on the weight value of each data block the set of data blocks of the point cloud representation and control the display device 104 to render the generated 3D heatmap visualization. The rendered 3D heatmap visualization may indicate regions of the point cloud representation that correspond to actual regions of the first product 402C where the production-related anomaly is present. Thus, the production-related anomaly present in the product may be localized based on the first 3D heatmap visualization. Each data block of the 3D data 402A or the first product 402C may be filled with colors. The colors used to fill each data block may be a warmer color or a cooler color based on the weight value for the corresponding data block.

At 408, it may be determined whether the first product 402C is acceptable to the user 114. In at least one embodiment, the circuitry 202 may be configured to determine whether the first product 402C is acceptable to the user 114. The acceptability may be determined based on a parameter that may quantify the production-related anomaly in the first product 402C. The parameter may be determined based on the first visual metric and the second visual metric. The first product 402C may be acceptable if the parameter (quantifying the production-related anomaly) is less than the threshold. The threshold may be set based on one or more user inputs related to a quality of a product.

At 410, the first product 402C may be accepted. The circuitry 202 may determine that the manufacturing quality of the first product 402C is adequate (or that the production-related anomaly is acceptable) if the parameter is less than the threshold. Based on the determination, the circuitry 202 may control the display device 104 to render a message that indicates that the quality of the first product 402C is adequate and that the first product 402C may be acceptable to the user 114.

At 412, the first product 402C may be rejected. The circuitry 202 may determine that the manufacturing quality of the first product 402C is inadequate (or the production-related anomaly is unacceptable) if the parameter is greater than the threshold. Based on the determination, the circuitry 202 may control the display device 104 to render a message that indicates that the quality of the first product 402C is inadequate and that the first product 402C may not be acceptable to the user 114.

The electronic apparatus 102 may generate 3D data representative of a product (such as the first product 402C, the second product 402D, or any other product) in the assembly line 402B and use the 3D data to validate the manufacturing quality of the product prior to packaging of the product. Thus, requirement for arranging an additional physical space in the 3D environment for quality check, and associated cost for acquiring such additional physical space may be eliminated.

Although illustrated with discrete blocks, the exemplary operations associated with one or more blocks of the block diagram 400 may be divided into additional blocks, combined into fewer blocks, or eliminated, based on implementation of the exemplary operations.

Figure 5:
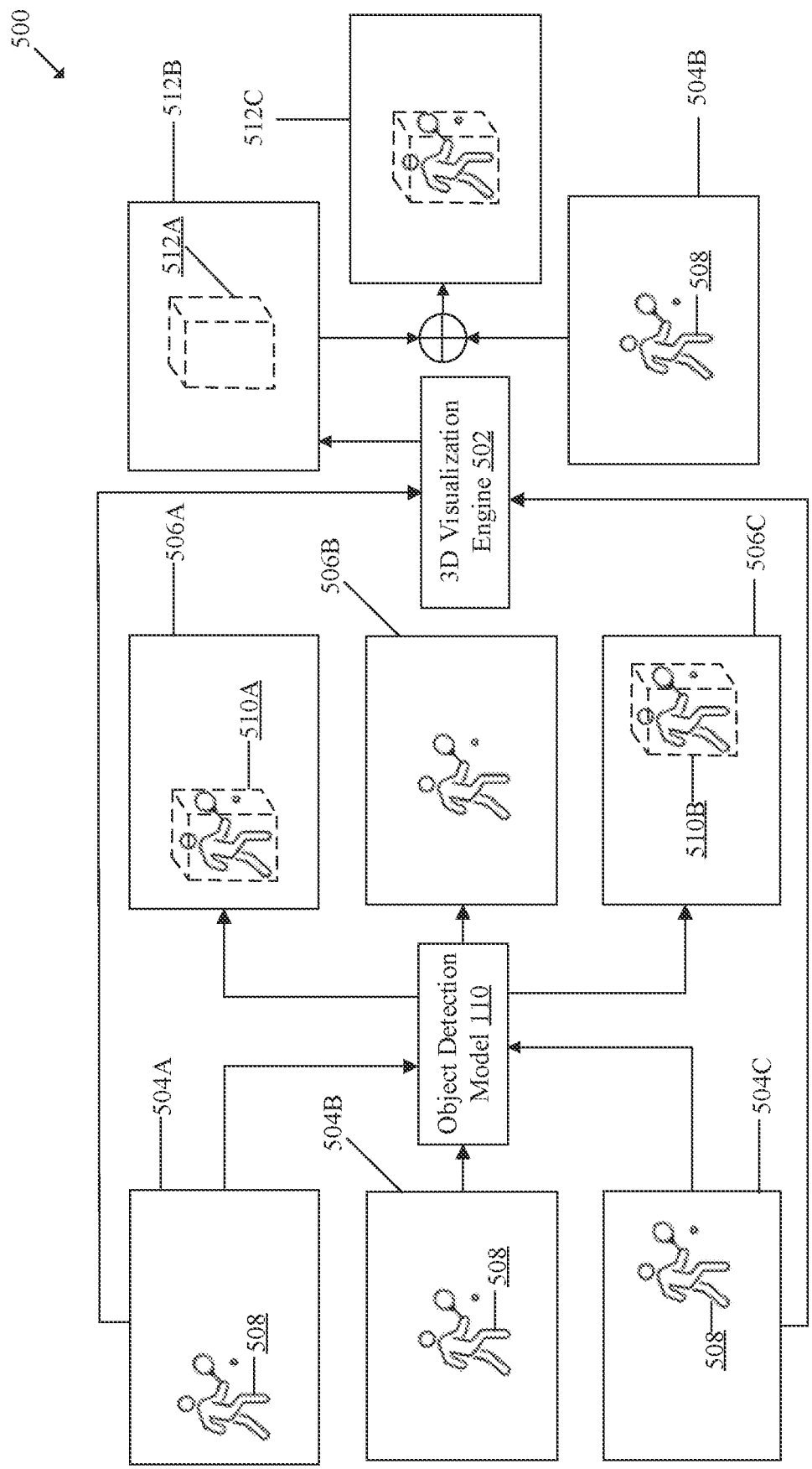
FIG. 5 is a diagram that illustrates an exemplary scenario for predicting a position of a 3D object in a 3D frame based on predicted positions of the 3D object in other 3D frames, in accordance with an embodiment of the disclosure.

FIG. 5 is a diagram that illustrates an exemplary scenario for predicting a position of a 3D object in a 3D frame based on predicted positions of the 3D object in other 3D frames, in accordance with an embodiment of the disclosure. FIG. 5 is explained in conjunction with elements from FIG. 1, FIG. 2, FIG. 3A, FIG. 3B, and FIG. 4. With reference to FIG. 5, there is shown an exemplary scenario 500. In the exemplary scenario 500, there is shown a 3D visualization engine 502, a set of input 3D frames 504A-504C, a set of 3D object detection results 506A-506C, and an output 3D frame. The set of input 3D frames 504A-504C may include a first 3D frame 504A, a second 3D frame 504B, and a third 3D frame 504C. The set of input 3D frames 504A-504C may be point cloud frames of a 3D video. The set of 3D object detection results 506A-506C may include a first result 506A, a second result 506B, and a third result 506C. The circuitry 202 may be configured to predict a position of a 3D object 508 (for example, a player) in the second 3D frame 504B based on a position of the 3D object 508 in the first 3D frame 504A and a position of the 3D object 508 in the third 3D frame 504C.

In accordance with an embodiment, the circuitry 202 may be configured to acquire 3D data that includes the set of input 3D frames 504A-504C (i.e., the point cloud frames of the 3D video). The acquisition may be sequential, i.e., the first 3D frame 504A may be acquired at T-1, the second 3D frame 504B may be acquired at T-2, and the third 3D frame 504C may be acquired at T-3. Each input 3D frame may be acquired from a dynamic 3D environment (for example, a tennis court arena where the 3D object 508 is moving). The 3D object 508 may be an object of interest. The 3D environment may include multiple 3D objects (including the 3D object 508) and each input 3D frame of the set of input 3D frames 504A-504C may include multiple 3D objects. For clarity of illustration, the set of input 3D frames 504A-504C is shown to include the 3D object 508 only. Since the 3D environment is dynamic, positions of the 3D object 508 may be different in each input 3D frame. The 3D object 508 may be at a first position in a 3D coordinate space (in the 3D environment) in the first 3D frame 504A, at a second position in the 3D coordinate space in the second 3D frame 504B, and at a third position in the 3D coordinate space in the third 3D frame 504C.

Once the set of input 3D frames 504A-504C is acquired, the circuitry 202 may sequentially apply the 3D object detection model 110 on each input 3D frame. The application may result in a sequential generation of object detection results, i.e., the set of 3D object detection results 506A-506C. The first result 506A may be generated based on the application of the 3D object detection model 110 on the first 3D frame 504A. The second result 506B may be generated based on the application of the 3D object detection model 110 on the second 3D frame 504B. The third result 506C may be generated based on the application of the 3D object detection model 110 on the third 3D frame 504C. Each 3D object detection result of the set of 3D object detection results 506A-506C may include a 3D bounding box for the 3D object 508 if the 3D object 508 is detected, by the 3D object detection model 110, in a corresponding input 3D frame of the set of input 3D frames 504A-504C. The first result 506A may include a first 3D bounding box 510A and the third result 506C may include a second 3D bounding box 510B. However, the second result 506B may not include any 3D bounding box. The absence of any 3D bounding box in the second result 506B may indicate that the 3D object detection model 110 failed to detect or missed the 3D object 508 (object of interest) in the second 3D frame 504B.

In such a scenario, the circuitry 202 may be configured to input the first 3D frame 504A and the third 3D frame 504C to the 3D visualization engine 502. In accordance with an embodiment, the 3D visualization engine 502 may perform a sequence of operations that may start from 304 and end at 316, for each of the first 3D frame 504A and the third 3D frame 504C as the acquired 3D data. Based on the sequence of operations for the first 3D frame 504A, the circuitry 202 may generate a first 3D heatmap visualization of the 3D object 508. The first 3D heatmap visualization may include the first 3D bounding box 510A. The first 3D bounding box 510A may include the 3D object 508 in the first 3D frame 504A. Similarly, a second 3D heatmap visualization of the 3D object 508 may be generated based on the sequence of operations for the third 3D frame 504C. The second 3D heatmap visualization may include the second 3D bounding box 510B. The second 3D bounding box 510B may include the 3D object 508 in the third 3D frame 504C.

The circuitry 202 may be further configured to predict a position of a 3D bounding box 512A based on a position of the first 3D bounding box 510A in the first 3D frame 504A and a position of the second 3D bounding box 510B in the third 3D frame 504C. The prediction of the position of the 3D bounding box 512A may involve a determination of coordinates of the 3D bounding box 512A based on interpolation using coordinates of the first 3D bounding box 510A and corresponding coordinates of the second 3D bounding box 510B. The predicted position of the 3D bounding box 512A on a blank 3D frame 512B may be indicative of a position of the 3D object 508 in the second 3D frame 504B. The resolution of the blank 3D frame 512B may be same as that of the first 3D frame 504A and the third 3D frame 504C. The circuitry 202 may be further configured to accumulate the second 3D frame 504B and the blank 3D frame 512B to generate an output 3D frame 512C. In some embodiments, the 3D bounding box 512A may be superimposed on the second 3D frame 504B for generation of the output 3D frame 512C. The predicted position of the 3D bounding box 512A in the output 3D frame 512C may be such that the 3D object 508 is included in the 3D bounding box 512A.

In accordance with an embodiment, the circuitry 202 may be configured to validate the predicted position of the 3D bounding box 512A based on two visualization metrics, viz., a third metric and a fourth metric. For the verification, the output 3D frame 512C may be partitioned into a third set of data blocks. The size of each data block of the third set of data blocks may be such that the 3D bounding box 512A encloses a third subset of data blocks of the third set of data blocks. The circuitry 202 may determine a first count of data blocks of the third set of data blocks that belong to the 3D object 508 and are inside the 3D bounding box 512A, a second count of data blocks of the third set of data blocks that do not belong to the 3D object 508 and are inside the 3D bounding box 512A, a third count of data blocks of the third set of data blocks that belong the 3D object 508 and are outside the 3D bounding box 512A, a first sum of the first count and the second count, and a second sum of the first count and the third count. The third metric may be a ratio of the first count and the first sum, while the fourth metric may be ratio of the first count and the second sum. The third metric may be indicative of a degree of occupancy of the 3D object 508 inside the 3D bounding box 512A and the fourth metric may be indicative of a portion of the 3D object 508 inside the 3D bounding box 512A. The predicted position of the 3D bounding box 512A may be accurate if both the third metric and fourth metric are "1". The predicted position of the 3D bounding box 512A may be acceptable if the third metric and fourth metric are greater than a threshold value (for example, 0.85).

In some embodiments, the circuitry 202 may be configured to interpolate the second 3D heatmap visualization for the 3D object 508 in the second 3D frame 504B based on the first 3D heatmap visualization of the 3D object 508 in the first 3D frame 504A.

Figure 6:
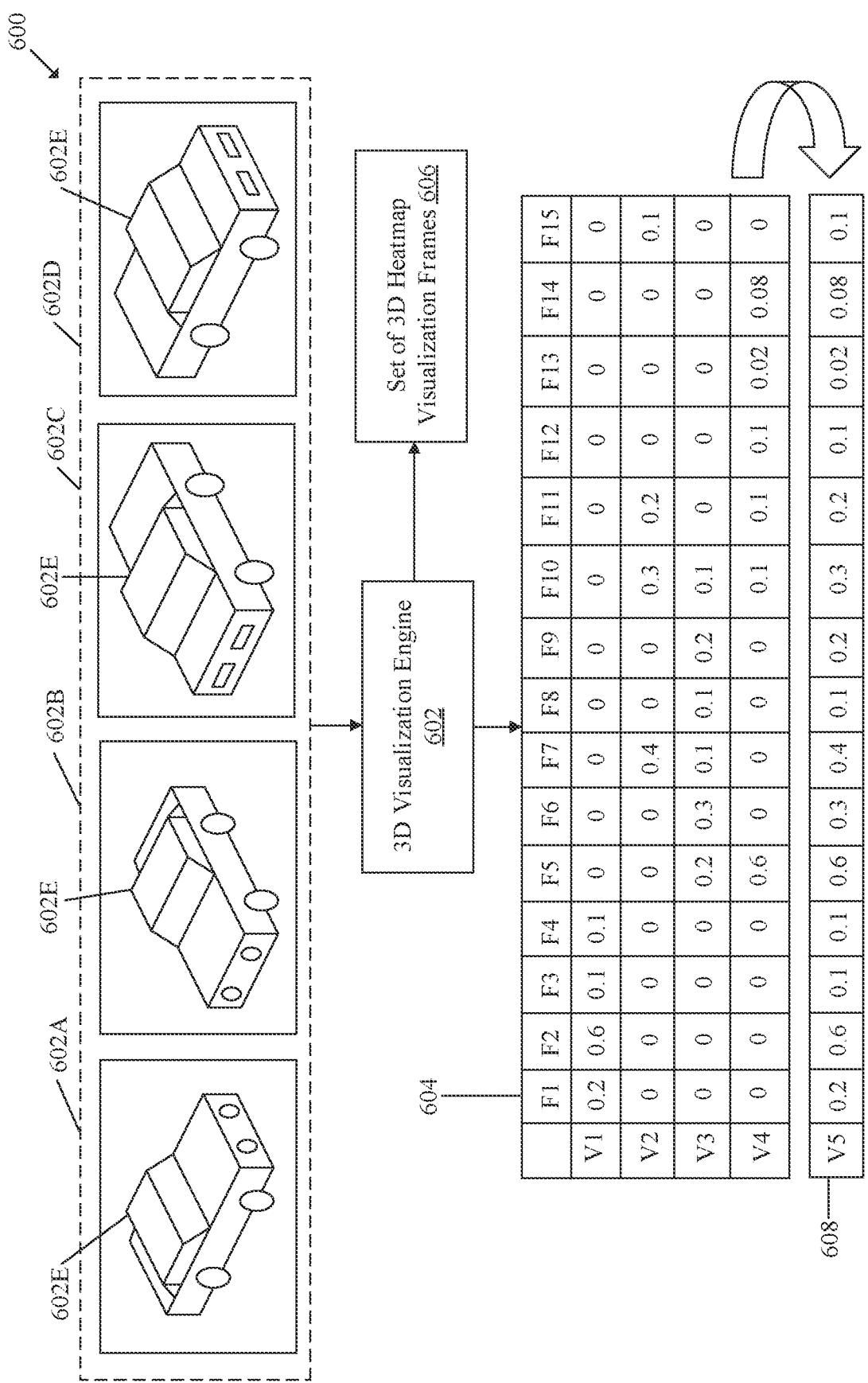
FIG. 6 is a diagram that illustrates an exemplary scenario for generating feature vectors associated with object detection results for a 3D object, in accordance with an embodiment of the disclosure.

FIG. 6 is a diagram that illustrates an exemplary scenario for generating feature vectors associated with object detection results for a 3D object, in accordance with an embodiment of the disclosure. FIG. 6 is explained in conjunction with elements from FIG. 1, FIG. 2, FIG. 3A, FIG. 3B, FIG. 4, and FIG. 5. With reference to FIG. 6, there is shown an exemplary scenario 600. In the exemplary scenario 600, there is shown a 3D visualization engine 602, which is executable by the circuitry 202. There is further shown 3D data that may correspond to a set of 3D point clouds 602A-602D. Each 3D point cloud of the set of 3D point clouds 602A-602D may include a 3D object 602E (for example, a car). During operation, the circuitry 202 may be configured to generate, by use of the 3D visualization engine 602, a set of feature vectors 604 and a set of 3D heatmap visualization frames 606. The set of feature vectors 604 may be associated with object detection results for the 3D object 602E.

At any instant, the 3D data may be acquired. The 3D data may include a set of 3D point cloud frames (i.e., the set of 3D point clouds 602A-602D). Each 3D point cloud frame of the set of 3D point cloud frames may capture a viewpoint associated with the 3D object 602E. The set of 3D point clouds 602A-602D may be associated with an exemplary 3D environment. For example, the 3D environment may be a virtual reality environment that may be rendered as immersive content on a virtual reality device (for example, a virtual reality headset). Each 3D point cloud of the set of 3D point clouds 602A-602D may be associated with a viewpoint of the 3D object 602E. For example, a first 3D point cloud 602A may be associated with a first viewpoint, a second 3D point cloud 602B may be associated with a second viewpoint, a third 3D point cloud 602C may be associated with a third viewpoint, and a fourth 3D point cloud 602D may be associated with a fourth viewpoint.

The circuitry 202 may be configured to partition, via the 3D visualization engine 602, each 3D point cloud of the set of 3D point clouds 602A-602D into a set of data blocks. For example, the first 3D point cloud 602A may be partitioned into a first set of data blocks, the second 3D point cloud 602B may be partitioned into a second set of data blocks, the third 3D point cloud 602C may be partitioned into a third set of data blocks, and the fourth 3D point cloud 602D may be partitioned into a fourth set of data blocks. From each 3D point cloud (such as the first 3D point cloud 602A), the circuitry 202 may generate a set of variations (such as a first set of variations) of the corresponding 3D point cloud. The generation may be based on a modification of a set of data blocks (such as the first set of data blocks) into which the corresponding 3D point cloud may be partitioned.

Each variation of the first set of variations of the first 3D point cloud 602A may be sequentially provided to the 3D object detection model 110 as input. Similarly, each variation of each variation of a second set of variations (of the second 3D point cloud 602B), a third set of variations (of the third 3D point cloud 602C), and a fourth set of variations (of the fourth 3D point cloud 602D), may be provided to the 3D object detection model 110. A first set of object detection results corresponding to the first set of variations may be obtained as output of the 3D object detection model 110. Similarly, a second set of object detection results corresponding to the second set of variations, a third set of object detection results corresponding to the third set of variations, and a fourth set of object detection results corresponding to the fourth set of variations may be obtained as output of the 3D object detection model 110.

Each object detection result of the first set of object detection results may include coordinates of a 3D bounding box for the 3D object 602E that may completely or partially include the 3D object 602E. The coordinates of a 3D bounding box may be predicted based on a prediction that the 3D object 602E is included in a variation of the first set of variations (of the first 3D point cloud 602A). The circuitry 202 may predict that the 3D object 602E is included in the variation if an object score associated with the 3D object 602E in the variation is greater than a threshold score. In accordance with an embodiment, the object score may be determined based on values of a set of features (for example, F1-F15) associated with the 3D object 602E (detected in the variation). The object score may be a feature vector that includes fifteen vector components, viz., F1-F15. Each vector component may be representative of a feature associated with the 3D object 602E. Similarly, the circuitry 202 may predict that 1D object 602E is included in each of the other variations of the first set of variations based on object scores associated with the 3D object 602E for the corresponding variation. For example, the first set of variations may include ten variations of the first 3D point cloud 602A, which may be generated based on ten different modifications of the first set of data blocks. Based on application of the 3D object detection model 110 on each variation of the first set of variations, ten object scores may be obtained. The circuitry 202 may further determine a final object score (represented as V1) based on an average or a summation of the ten object scores. V1 may indicate certain features (such as F1, F2, F3, and F4) associated with the 3D object 602E that may be detected in the first 3D point cloud 602A, which, in turn, may be associated with the first viewpoint. Thereafter, the circuitry 202 may predict that the 3D object 602E is included in each variation of the second set of variations (of the second 3D point cloud 602B) based on an object score associated with the 3D object 602E. Based on a count of variations (for example, ten versions) in the second set of variations, ten object scores may be obtained. The circuitry 202 may determine a final object score based on an average or a summation of the ten object scores. The final object score may be represented as V2. V2 may indicate certain features (such as F7, F10, F11, and F15) associated with the 3D object 602E that may be detected in the second 3D point cloud 602B, which, in turn, may be associated with the second viewpoint. Similarly, final object scores V3 and V4 may be determined based on detection of the 3D object 602E in each variation of the third set of variations and each variation of the fourth set of variations. The final object score V3 may be indicative of features F5, F6, F7, F8, F9, and F10 that are detected in the third 3D point cloud 602C and are associated with the third viewpoint of the 3D object 602E. The final object score V4 may be indicative of features F5, F10, F11, F12, F13, and F14 that are detected in the fourth 3D point cloud 602D and are associated with the fourth viewpoint of the 3D object 602E. The final object scores, viz., V1, V2, V3, and V4 may constitute the set of feature vectors 604.

In accordance with an embodiment, the circuitry 202 may determine, for each feature vector of the set of feature vectors 604, vector components or features, that may be important or critical for detection of the object 602E in each of the point clouds of the set of 3D point clouds 602A-602D. The important features may be those features whose values may be greater than a first predefined threshold. For example, if the threshold is 0.1, then features F1 and F2 in V1 may be determined as important. Similarly, features F7, F10, and F11, in V2 may be determined as important. The circuitry 202, may further determine, for each feature vector associated with a viewpoint of the 3D object 602E, a feature of the set of features (i.e., F1-F15) that represents the best view of the 3D object 602E in the corresponding feature vector. The feature may be that which is greater than a second threshold or that whose value is maximum amongst the other features of the set of features. For example, feature F6 may be determined as the feature that represents the best view of the 3D object 602E in V3. Similarly, feature F5 may be determined as the feature that represents the best view of the 3D object 602E in V4.

The circuitry 202 may train the regression model 112 based on the first set of object detection results (i.e., V1), the second set of object detection results (i.e., V2), the third set of object detection results (i.e., V3), and the fourth set of object detection results (i.e., V4). Using the trained regression model 112, the circuitry 202 may determine a weight value for each data block of the first set of data blocks, the second set of data blocks, the third set of data blocks, and the fourth set of data blocks. The weight value of each data block may indicate a likelihood of whether the 3D object 602E is included in a corresponding data block. Once the weight value of each data block is determined, the set of 3D heatmap visualization frames 606 may be generated.

The set of 3D heatmap visualization frames 606 may include a first 3D heatmap visualization frame corresponding to the first set of object detection results, a second 3D heatmap visualization frame corresponding to the second set of object detection results, a third 3D heatmap visualization frame corresponding to the third set of object detection results, and a fourth 3D heatmap visualization frame corresponding to the fourth set of object detection results. The first 3D heatmap visualization frame may include a first 3D heatmap visualization of the 3D object 602E. The first 3D heatmap visualization may facilitate visualization of the first set of object detection results and the first 3D heatmap visualization frame may be generated based on the determined weight value for each data block of the first set of data blocks. The first 3D heatmap visualization frame may include a subset of data blocks of the first set of data blocks 304A that belong to the 3D object 602E. In accordance with an embodiment, the circuitry 202 may select a color to fill each data block of the subset of data blocks. The selection of the color may be based on a color scheme and the weight value for each data block of the subset of data blocks. Similarly, the second 3D heatmap visualization frame may include a second 3D heatmap visualization of the 3D object 602E, the third 3D heatmap visualization frame may include a third 3D heatmap visualization of the 3D object 602E, and the fourth 3D heatmap visualization frame may include a fourth 3D heatmap visualization of the 3D object 602E.

In accordance with an embodiment, the circuitry 202 may generate a global heatmap based on the feature vectors associated with all viewpoints (i.e., V1, V2, V3, and V4) of the 3D object 602E. The global heatmap may provide a dynamic and real-time visualization of the 3D environment that includes the 3D object 602E. The generation of the global heatmap may involve determination of a maximum value associated with each feature of the set of features amongst values of the corresponding feature in each of the feature vectors. For example, the set of values of F1 in each of V1, V2, V3, and V4 may include 0.2, 0, 0, and 0, respectively. The maximum value in the set (0.2, 0, 0, 0) is 0.2. Thus, the maximum value associated with F1 is 0.2. Similarly, the maximum value associated with F2 is 0.6. Based on the maximum values associated with all features of the set of features, a global feature vector (i.e., V5) 608 may be generated. The circuitry 202 may train the regression model 112 (i.e., update the weights of the regression model 112) based on values (i.e., the determined maximum values) of the vector components (i.e., features) of the global feature vector 608 (which may correspond to a set of object detection results). The global heatmap may be generated based on the trained regression model 112.

Figure 7:
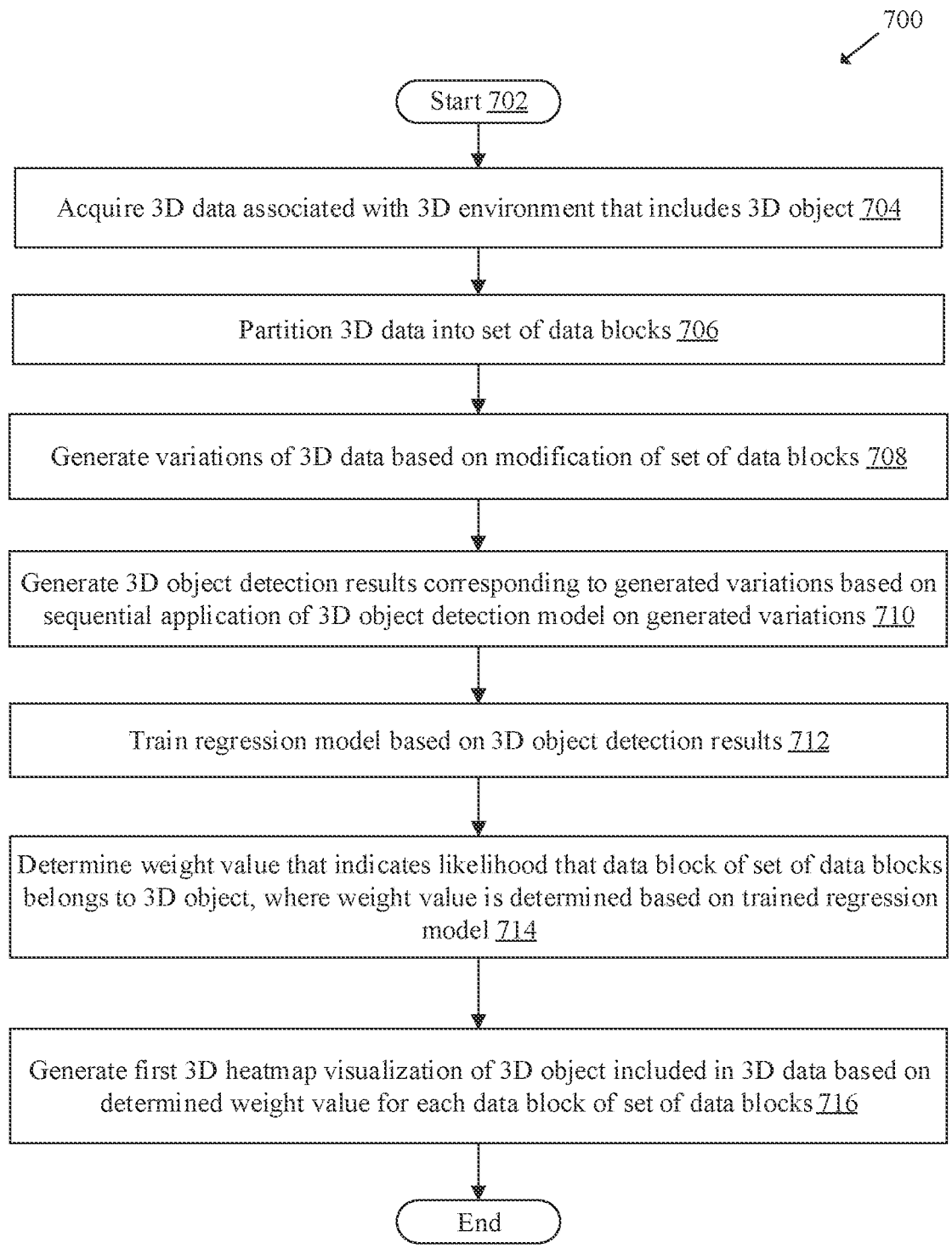
FIG. 7 is a flowchart that illustrates operations for an exemplary method for visualization of AI-generated predictions from 3D data, in accordance with an embodiment of the disclosure.

FIG. 7 is a flowchart that illustrates operations for an exemplary method for visualization of AI-generated predictions from 3D data, in accordance with an embodiment of the disclosure. FIG. 6 is explained in conjunction with elements from FIG. 1, FIG. 2, FIG. 3A, FIG. 3B, FIG. 4, FIG. 5, and FIG. 6. With reference to FIG. 7, there is shown a flowchart 700. The operations from 702 to 716 may be implemented by any computing system, such as, by the electronic apparatus 102, or the circuitry 202 of the electronic apparatus 102, of FIG. 1. The operations may start at 702 and may proceed to 704.

At 704, 3D data 116 associated with a 3D environment that includes a 3D object 118 may be acquired. In at least one embodiment, the circuitry 202 may be configured to acquire the 3D data associated with the 3D environment that includes the 3D object 118. The details of acquisition of the 3D data 116, is described, for example, in FIG. 1, FIG. 3A, and FIG. 4.

At 706, the 3D data 116 may be partitioned into a set of data blocks. In at least one embodiment, the circuitry 202 may be configured to partition the 3D data 116 into a set of data blocks. The details of partitioning of the 3D data 116, is described, for example, in FIG. 1 and FIG. 3A.

At 708, variations of the 3D data 116 may be generated based on a modification of the set of data blocks. In at least one embodiment, the circuitry 202 may be configured to generate variations of the 3D data 116 based on the modification of the set of data blocks. The details of generation of the variations of the 3D data 116, is described, for example, in FIG. 1 and FIG. 3A.

At 710, 3D object detection results corresponding to the generated variations may be generated based on a sequential application of the 3D object detection model 110 on the generated variations. In at least one embodiment, the circuitry 202 may be configured to generate the 3D object detection results corresponding to the generated variations based on the sequential application of the 3D object detection model 110 on the generated variations. The details of generation of the 3D object detection results, are described, for example, in FIG. 1 and FIG. 3B.

At 712, the regression model 112 may be trained based on the 3D object detection results. In at least one embodiment, the circuitry 202 may be configured to train the regression model 112 based on the 3D object detection results. The details of training of the regression model 112, are described, for example, FIG. 1, FIG. 3A, and FIG. 3B.

At 714, a weight value, that may indicate a likelihood that a data block of the set of data blocks belongs to the 3D object 118, may be determined. In at least one embodiment, the circuitry 202 may be configured to determine the weight value that may indicate a likelihood that a data block of the set of data blocks belongs to the 3D object 118. The weight value may be determined based on the trained regression model 112. The details of determination of the weight value for each data block of the set of data blocks, are described, for example, in FIG. 1 and FIG. 3B.

At 716, a first 3D heatmap visualization 124 of the 3D object 118 included in the 3D data 116 may be generated based on the determined weight value for each data block of the set of data blocks. In at least one embodiment, the circuitry 202 may be configured to generate the first 3D heatmap visualization 124 of the 3D object 118 included in the 3D data 116 based on the determined weight value for each data block of the set of data blocks. Control may pass to end.

Although the flowchart 700 is illustrated as discrete operations, such as 704, 706, 708, 710, 712, 714, and 716, the disclosure is not so limited. Accordingly, in certain embodiments, such discrete operations may be further divided into additional operations, combined into fewer operations, or eliminated, depending on the implementation without detracting from the essence of the disclosed embodiments.

In some embodiments, the 3D data 302A may be a 3D point cloud. The circuitry 202 may determine global features associated with the 3D points of the 3D point cloud. The circuitry 202 may further determine a (local) feature associated with each 3D point of the 3D point cloud. Based on the determined features, a set of object detection results (i.e., predictions) may be generated as outputs of the 3D object detection model 110 (e.g., a point net network). The set of object detection results may indicate results of detection of one or more 3D objects included in the 3D point cloud. The circuitry 202 may determine or identify nodes of the 3D object detection model 110 that may be involved in, or have significantly contributed towards, generation of each prediction (i.e., each object detection result of the set of object detection results). Once the nodes are identified, a gradient of each identified node (i.e., a scaler value) may be computed with respect to each of the determined global features. Thus, the circuitry 202 may compute a set of gradient values, which may correspond to the set of object detection results and associated nodes identified as contributors towards the generation of the set of object detection results. Once the set of gradient values are determined, the circuitry 202 may determine the gradient with the largest value. The determined gradient may be associated with a global feature of the determined global features and an identified node, for which the determined gradient was computed with respect to the global feature. The global feature may be the most sensitive global feature 3D point for a prediction generated by the identified node. Thereafter, the circuitry 202 may set a threshold value to be used for filtering gradients of the identified nodes. The circuitry 202 may compare each gradient value of the set of gradient values with the set threshold. Thereafter, one or more gradient values of the set of gradient values that are lower than the set threshold may be filtered/removed. Thereafter, the circuitry 202 may compute a weighted feature for each 3D point of the 3D point cloud (i.e., the 3D data 302A) and an average of the weighted feature computed for each 3D point. Based on computed weighted feature of each 3D point and the average weighted feature, the circuitry 202 may generate a heatmap.

Various embodiments of the disclosure may provide a non-transitory computer-readable medium and/or storage medium having stored thereon, computer-executable instructions executable by a machine and/or a computer to operate an electronic apparatus (such as the electronic apparatus 102). The computer-executable instructions may cause the machine and/or computer to perform operations that include acquisition of 3D data 116 associated with a 3D environment that includes a 3D object 118. The operations may further include partitioning of the 3D data 116 into a set of data blocks. The operations may further include generation of variations of the 3D data 116 based on a modification of the set of data blocks. The operations may further include generation of 3D object detection results corresponding to the generated variations based on a sequential application of the 3D object detection model 110 on the generated variations. The operations may further include training the regression model 112 based on the 3D object detection results. The operations may further include determination of a weight value that may indicate a likelihood that a data block of the set of data blocks belongs to the 3D object 118. The weight value may be determined based on the trained regression model 112. The operations may further include generation of a first 3D heatmap visualization 124 of the 3D object 118 included in the 3D data 116 based on the determined weight value for each data block of the set of data blocks.

Exemplary aspects of the disclosure may include an electronic apparatus (such as, the electronic apparatus 102 of FIG. 1) that may include circuitry (such as the circuitry 202. The electronic apparatus 102 may further include memory (such as the memory 204 of FIG. 2) that may be configured to store the 3D object detection model 110. The circuitry 202 may be configured to acquire 3D data associated with a 3D environment that includes a 3D object. The 3D environment may correspond to a production environment and the 3D object may be a product on an assembly line of the production environment. The 3D data may be a 3D point cloud, a frame of a 3D video, volumetric or voxelized data, or a 3D mesh. The 3D data may be a 3D video of point cloud frames that includes a first 3D frame in which the 3D object is at a first position in a 3D coordinate space and a second 3D frame in which the 3D object is at a second position in the 3D coordinate space. The circuitry 202 may be further configured to partition the 3D data into a set of data blocks. The 3D data may be partitioned based on a 3D window-based segmentation function. The circuitry 202 may be further configured to generate variations of the 3D data based on a modification of the set of data blocks. The circuitry 202 may be further configured to generate 3D object detection results corresponding to the generated variations based on a sequential application of the 3D object detection model 110 on the generated variations. Each 3D object detection result of the generated 3D object detection results may include a 3D bounding box for the 3D object. The circuitry 202 may be further configured to train the regression model 112 based on the 3D object detection results. The regression model 112 may be trained further based on the segmentation features. The circuitry 202 may be further configured to determine a weight value that may indicate a likelihood that a data block of the set of data blocks belongs to the 3D object. The weight value may be determined based on the trained regression model. The weight value for each data block of the set of data blocks may correspond to a coefficient of the trained regression model 112. The circuitry 202 may be further configured to generate a first 3D heatmap visualization of the 3D object included in the 3D data based on the determined weight value for each data block of the set of data blocks.

In accordance with an embodiment, the circuitry 202 may be further configured to randomly select a subset of data blocks from the set of data blocks. The modification for each of the variations may include a removal of the selected subset of data blocks from the set of data blocks.

In accordance with an embodiment, the circuitry 202 may be further configured to track, from a plurality of neural network nodes in the 3D object detection model 110, one or more neural network nodes which may be responsible for the generation of the 3D object detection results.

In accordance with an embodiment, the circuitry 202 may be further configured to generate segmentation features corresponding to the generated variations based on a size of the set of the data blocks and the modification. each of the segmentation features may be a feature vector. Each value of the feature vector may indicate whether a data block of the set of data blocks is included in a corresponding variation of the generated variations.

In accordance with an embodiment, the circuitry 202 may be further configured to determine a first count of first weight values which are greater than zero and are inside the 3D bounding box. The first count may be determined based on a comparison of the weight value for each data block of the set of data blocks with a weight threshold. The circuitry may be further configured to determine a second count based on a summation of the first count and a count of second weight values which are equal to zero inside the 3D bounding box. The count of second weight values may be determined based on the comparison. The circuitry may be further configured to compute a first visual metric as a ratio of the first count to the second count. The circuitry may be further configured to determine a third count based on a summation of the first count and a count of third weight values which are greater than zero outside the 3D bounding box. The count of third weight values may be determined based on the comparison. The circuitry may be further configured to compute a second visual metric as a ratio of the first count to the third count.

In accordance with an embodiment, the circuitry 202 may be further configured to localize one or more production-related anomalies in the product based on the first 3D heatmap visualization.

In accordance with an embodiment, the circuitry 202 may be further configured to interpolate a second 3D heatmap visualization for the 3D object in the second 3D frame based on the first 3D heatmap visualization.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic apparatus, comprising:
   a memory configured to store a three-dimensional (3D) object detection model; and
   circuitry configured to:
   acquire 3D data associated with a 3D environment that includes a 3D object;
   partition the 3D data into a set of data blocks;
   generate variations of the 3D data based on a modification of the set of data blocks;
   generate 3D object detection results corresponding to the generated variations based on an application of the 3D object detection model on the generated variations, wherein
     each 3D object detection result of the generated 3D object detection results includes a 3D bounding box for the 3D object;
   train a regression model based on the 3D object detection results;
   determine a weight value which indicates that a data block of the set of data blocks is associated with the 3D object, wherein the weight value is determined based on the trained regression model;
   determine a first count of first weight values based on a comparison of the weight value for each data block of the set of data blocks with a weight threshold, wherein the first weight values are greater than zero and are inside the 3D bounding box; and
   generate a first 3D heatmap visualization of the 3D object included in the 3D data based on the determined weight value for the each data block of the set of data blocks.

2. The electronic apparatus according to claim 1, wherein the 3D data is one of a 3D point cloud, a frame of a 3D video, volumetric or voxelized data, or a 3D mesh.

3. The electronic apparatus according to claim 1, wherein the 3D data includes a set of 3D point cloud frames and each 3D point cloud frame of the set of 3D point cloud frames captures a viewpoint associated with the 3D object.

4. The electronic apparatus according to claim 1, wherein the 3D data corresponds to a dynamic environment in which the 3D object is in a mobile state or a static environment in which the 3D object is in a static state.

5. The electronic apparatus according to claim 1, wherein the 3D data is partitioned based on a 3D window-based segmentation function.

6. The electronic apparatus according to claim 1, wherein the circuitry is further configured to randomly select a subset of data blocks from the set of data blocks, and
   the modification for each of the variations includes a removal of the selected subset of data blocks from the set of data blocks.

7. The electronic apparatus according to claim 1, wherein the circuitry is further configured to track, from a plurality of neural network nodes in the 3D object detection model, at least one neural network node which is responsible for the generation of the 3D object detection results.

8. The electronic apparatus according to claim 1, wherein the circuitry is further configured to generate segmentation features corresponding to the generated variations based on a size of the set of the data blocks and the modification, wherein
   each of the segmentation features is a feature vector, and
   each value of the feature vector indicates whether a data block of the set of data blocks is included in a corresponding variation of the generated variations.

9. The electronic apparatus according to claim 8, wherein the regression model is trained further based on the segmentation features.

10. The electronic apparatus according to claim 1, wherein the weight value for the each data block of the set of data blocks corresponds to a coefficient of the trained regression model.

11. The electronic apparatus according to claim 1, wherein the circuitry is further configured to:
   determine a second count based on a summation of the first count and a count of second weight values which are equal to zero inside the 3D bounding box, and
     the count of second weight values is determined based on the comparison; and
   compute a first visual metric as a ratio of the first count to the second count.

12. The electronic apparatus according to claim 1, wherein the circuitry is further configured to:
   determine a third count based on a summation of the first count and a count of third weight values which are greater than zero outside the 3D bounding box, and
     the count of third weight values is determined based on the comparison; and compute a second visual metric as a ratio of the first count to the third count.

13. The electronic apparatus according to claim 1, wherein the 3D environment corresponds to a production environment and the 3D object is a product on an assembly line of the production environment.

14. The electronic apparatus according to claim 13, wherein the circuitry is further configured to localize at least one production-related anomaly in the product based on the first 3D heatmap visualization.

15. The electronic apparatus according to claim 1, wherein the 3D data is a 3D video of point cloud frames that includes a first 3D frame in which the 3D object is at a first position in a 3D coordinate space and a second 3D frame in which the 3D object is at a second position in the 3D coordinate space.

16. A method, comprising:
in an electronic apparatus that includes a memory for storing a three-dimensional (3D) object detection model:
acquiring 3D data associated with a 3D environment that includes a 3D object;
partitioning the 3D data into a set of data blocks;
generating variations of the 3D data based on a modification of the set of data blocks;
generating 3D object detection results corresponding to the generated variations based on an application of the 3D object detection model on the generated variations, wherein
each 3D object detection result of the generated 3D object detection results includes a 3D bounding box for the 3D object;
training a regression model based on the 3D object detection results;
determining a weight value which indicates that a data block of the set of data blocks is associated with the 3D object,
wherein the weight value is determined based on the trained regression model;
determining a first count of first weight values based on a comparison of the weight value for each data block of the set of data blocks with a weight threshold, wherein the first weight values are greater than zero and are inside the 3D bounding box; and
generating a first 3D heatmap visualization of the 3D object included in the 3D data based on the determined weight value for the each data block of the set of data blocks.

17. The method according to claim 16, further comprising generating segmentation features corresponding to the generated variations based on a size of the set of the data blocks and the modification, wherein
each of the segmentation features is a feature vector, and
each value of the feature vector indicates whether a data block of the set of data blocks is included in a corresponding variation of the generated variations.

18. A non-transitory computer-readable medium having stored thereon, computer-executable instructions that when executed by an electronic apparatus, causes the electronic apparatus to execute operations, the operations comprising:
acquiring three-dimensional (3D) data associated with a 3D environment that includes a 3D object;
partitioning the 3D data into a set of data blocks;
generating variations of the 3D data based on a modification of the set of data blocks;
generating 3D object detection results corresponding to the generated variations based on an application of a 3D object detection model on the generated variations, wherein
each 3D object detection result of the generated 3D object detection results includes a 3D bounding box for the 3D object;
training a regression model based on the 3D object detection results;
determining a weight value which indicates that a data block of the set of data blocks is associated with the 3D object,
wherein the weight value is determined based on the trained regression model;
determining a first count of first weight values based on a comparison of the weight value for each data block of the set of data blocks with a weight threshold, wherein the first weight values are greater than zero and are inside the 3D bounding box; and
generating a first 3D heatmap visualization of the 3D object included in the 3D data based on the determined weight value for the each data block of the set of data blocks.

* * * * *